(12) United States Patent
Habichler et al.

(10) Patent No.: US 7,805,381 B2
(45) Date of Patent: Sep. 28, 2010

(54) COMPETENCY SELF-ASSESSMENT APPROVAL

(75) Inventors: Juergen Habichler, Ismaning (DE); Isaac Lau, Toronto (CA); Yu Cheng Weng, Toronto (CA); Anthony Deighton, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1454 days.

(21) Appl. No.: 10/185,891

(22) Filed: Jun. 27, 2002

(65) Prior Publication Data

US 2007/0208575 A1 Sep. 6, 2007

Related U.S. Application Data

(63) Continuation-in-part of application No. 10/109,972, filed on Mar. 29, 2002, and a continuation-in-part of application No. 10/112,420, filed on Mar. 29, 2002, now abandoned, and a continuation-in-part of application No. 10/109,858, filed on Mar. 29, 2002, now abandoned, and a continuation-in-part of application No. 10/112,330, filed on Mar. 29, 2002, now abandoned.

(51) Int. Cl.
    *G06Q 99/00* (2006.01)
(52) U.S. Cl. ...................................... 705/320
(58) Field of Classification Search ............ 705/1, 705/320
    See application file for complete search history.

(56) References Cited

U.S. PATENT DOCUMENTS

| | | | | |
|---|---|---|---|---|
| 5,416,694 A | * | 5/1995 | Parrish et al. | 705/8 |
| 5,978,767 A | * | 11/1999 | Chriest et al. | 705/1 |
| 6,157,808 A | * | 12/2000 | Hollingsworth | 434/350 |
| 6,266,659 B1 | * | 7/2001 | Nadkarni | 707/3 |
| 6,275,812 B1 | * | 8/2001 | Haq et al. | 705/11 |
| 6,370,355 B1 | * | 4/2002 | Ceretta et al. | 434/350 |
| 6,524,109 B1 | * | 2/2003 | Lacy et al. | 434/219 |
| 6,735,570 B1 | * | 5/2004 | Lacy et al. | 705/7 |
| 6,754,874 B1 | * | 6/2004 | Richman | 715/507 |
| 6,767,213 B2 | * | 7/2004 | Fleishman | 434/236 |
| 6,944,624 B2 | * | 9/2005 | Orton et al. | 707/102 |
| 2003/0229529 A1 | * | 12/2003 | Mui et al. | 705/8 |

* cited by examiner

*Primary Examiner*—Jonathan Ouellette
(74) *Attorney, Agent, or Firm*—Campbell Stephenson LLP

(57) ABSTRACT

A method, system, and computer-readable medium for using competency-related information for individuals to provide a variety of benefits is described. In some situations, individuals may propose self-assessments of competencies that they believe that they possess, such as specified skill levels of specified skills. Various techniques to independently approve proposed self-assessed competencies can be provided, such as by defining groups of appropriate reviewers (e.g., supervisors, peers and/or subordinates) for self-assessed competencies and by automatically retrieving and processing validation information from such reviewers upon receipt of a competency self-assessment in order to determine whether to approve the self-assessed competency. Various approval criteria for a proposed competency self-assessment can also be specified, such as agreement of a majority of reviewers, unanimous validation by some or all of the specified reviewers, and/or a threshold for a weighted average of reviewers' assessed skill levels for the proposing individual.

10 Claims, 34 Drawing Sheets

Example Employee ZZ Competency Screen

505 My Current Work Position: Intermediate Software Engineer (Position # 2347)

510 My Current Skills
517 [New] 519 [Edit]

| | Skill Name | Parent Skill | Root Skill Category | Current Skill Level | Skill Gap | Required Skill Level | Date Of Accomplishment | Skill Description | Criticality |
|---|---|---|---|---|---|---|---|---|---|
| 512 | *C++ Skills* | *Progr. Skills* | *Tech. Skills* | *Intermediate* | *Yes* | *Expert* | *06/15/XX* | *C++ Programming* | *Medium* |
| 514 | Spanish Reading | Spanish | Lang. Skills | High Fluent | No | Fluent | 01/01/XY | Spanish Reading | Low |
| 516 | Spanish Writing | Spanish | Lang. Skills | 2 | Yes | 3 | 01/01/XY | Spanish Writing | Low |
| | ... | | | | | | | | |

520 Details For Selected Skill

| | Skill Name | Current Skill Level | Skill Level Rating System | Date Of Accomplishment | Accomplishment Basis | Validation | Employee Comments |
|---|---|---|---|---|---|---|---|
| 522 | C++ Skills | Intermediate | N-I-E-G | 06/15/XX | Course Completion - Organization XX Intermediate C++ Skills Training | - | Also had a related previous work project |

530 Skill Level Change History For Selected Skill

| | Skill Name | Skill Level | Date Of Accomplishment | Accomplishment Basis | Validation | Employee Comments |
|---|---|---|---|---|---|---|
| 532 | C++ Skills | Intermediate | 06/15/XX | Course Completion - Organization XX Intermediate C++ Skills Training | - | Previous work project also provided this skill |
| 534 | C++ Skills | Intermediate | 03/01/XX | Self-Assessment | Supervisors: AA Peers: BB, CC Subordinates: DD | My experience on the LMN Project provided these skills. |
| 536 | C++ Skills | Basic | 02/15/XY | Degree Completion – AA in Computer Studies | Supervisors: AA | Passed intro C++ class. |

*Fig. 5A*

Example Employee ZZ Competency Screen (cont'd)

540 My Other Competencies
547 [New] 549 [Edit]

| | Competency Name | Parent Competency | Competency Category | Competency Parameter | Date Of Accomplishment | Competency Description | Criticality |
|---|---|---|---|---|---|---|---|
| 542 | A.A. Degree | Education | Credentials | Computer Studies | 02/01/XY | A.A. degree from XYZ Junior College | - |
| 544 | Past Project Experience | Experience | Experience | LMN Project | 02/20/XX | Spanish Reading | Medium |
| | ... | | | | | | |

550 My Current Competency Gaps
557 [New] 559 [Edit]

| | Competency Name | Parent Competency | Competency Category | Current Skill Level | Target Skill Level | Gap Value | Planned Date Of Accomplishment | Criticality | Source |
|---|---|---|---|---|---|---|---|---|---|
| 552 | B.S. Degree | Education | Credentials | - | - | - | - | High | Current Work Position |
| 554 | C++ Skills | Progr. Skills | Skills | Intermediate | Expert | 5 | - | Medium | Performance Goal |
| 556 | Spanish Writing | Spanish | Lang. Skills | 2 | 3 | 20 | - | Medium | Manager Recommendation |
| 558 | Public Speaking | Communication | Capabilities | - | - | - | - | Low | Personal Goal |
| | ... | | | | | | | | |

560 My Planned Competencies

| | Competency Name | Parent Competency | Competency Category | Planned Skill Level | Required Skill Level | Planned Date Of Accomplishment | Planned Basis Of Accomplishment | Competency Description |
|---|---|---|---|---|---|---|---|---|
| 562 | | | | | | | | |

*Fig. 5B*

Example Employee ZZ Competency Screen (cont'd)

571 My Proposed Self-Assessed Skills

573 [New]  575 [Edit]  577 [Delete]  579 [Submit]

| | Skill Name | Parent Skill | Root Skill Category | Current Skill Level | Proposed Skill Level | Self-Assessment Comment | Hold? | Submitted Status | Approval Status | Approval Comments |
|---|---|---|---|---|---|---|---|---|---|---|
| 572 | Java Skills | Progr. Skills | Tech. Skills | Intermediate | Expert | I have 3+ years of experience | Yes | No | - | - |
| 574 | *Spanish Writing* | *Spanish* | *Lang. Skills* | *2* | *4* | - | - | Yes | Pending – 5 of 9 responses received | JXC: he did an excellent translation for me |
| 576 | Spanish Reading | Spanish | Lang. Skills | High Fluent | Fluent | While I passed the High Fluent exam, it was close and I need more practice | - | Yes | Pending | - |

580 Details For Selected Proposed Self-Assessed Skill

| | Skill Name | Proposed Skill Level | Skill Level Rating System | Date Of Skill Level Proposal Submission | Approval Group | Approval Criteria | | | | Approval Status Details |
|---|---|---|---|---|---|---|---|---|---|---|
| | | | | | | Response Rate | Required Response Types | Weighted Threshold | Response Type Weighting | |
| 582 | Spanish Writing | 4 | 1-5 | 07/05/XX | Supervisors: 2 levels Subordinates: 1 level Peers: current project | 75+% | Supervisors: 1+ Subordinates: 2+ Peers: 1+ | 3.85 | Supervisor: 2 Subordinate: 1 Peer: 1.3 | Current Weighted Validated Skill Level: 3.93  Current Response Rate: 56%  Required Response Types Satisfied: No |

*Fig. 5C*

Example Administrator Work Position Type Definition Screen

610 — Defined Organization Work Position Types

617 [New]  619 [Edit]

| | Work Position Type Name | Parent Work Position Type | Root Work Position Type | Summary Of Required Competencies | Summary Of Preferred Competencies |
|---|---|---|---|---|---|
| | ... | | | | |
| 612 | Intermediate Software Engineer | Software Engineer | Software Engineer | B.S. Degree: Computer Science; C++ Skills: Intermediate; ... | C++ Skills: Expert; ... |
| 614 | Senior Software Engineer – ABC Division | Senior Software Engineer | Software Engineer | C++ Skills: Expert; ... | ... |
| 616 | Senior Software Engineer – DEF Division | Senior Software Engineer | Software Engineer | C++ Skills: Intermediate; ... | C++ Skills: Expert; ... |
| | ... | | | | |

620 — Competency Details For Selected Work Position Type

527 [New]  629 [Edit]

| | Competency Name | Parent Competency | Competency Category | Skill Level Rating System | Required Skill Level | Date Required | Preferred Skill Level | Criticality |
|---|---|---|---|---|---|---|---|---|
| 622 | B.S. Degree | Education | Credentials | - | - | Start Date | - | High |
| 624 | C++ Skills | Progr. Skills | Tech. Skills | N-I-E-G | Intermediate | Start Date + 2 mos. | Expert | High |
| 626 | English Conversation | English | Lang. Skills | R-C-F-N | Conversant | Start Date | Fluent | Medium |
| 628 | XML Skills | Progr. Skills | Tech. Skills | N-I-E-G | - | - | Intermediate | Low |
| | ... | | | | | | | |

*Fig. 6B*

Example Employee ZZ Personalized Learning Recommendations

710 \ My Recommended Learning

| | Learning Activity | Associated Curriculum | Learning Type | Unfulfilled Prerequisites | Resulting Organization Competencies | Validation Needed | Related Competency Gaps | Gap Value | Value To Employee / Organization |
|---|---|---|---|---|---|---|---|---|---|
| 711 | Organization XX C++ Expert-Level Training Course | C++ Skills Training Series SW Engineer Expert-Level | Course | Online Exam – Advanced Programming Techniques | C++ Skills: Expert | | C++ Skills: Expert | 5 | Medium / High |
| 713 | Online Exam – Advanced Programming Techniques | *Prerequisite for Organization XX C++ Expert-Level Training Course* | Exam – Online | | | | C++ Skills: Expert | 5 | Medium / Medium |
| 715 | C++ Expert-Level Online Course by Organization LL | | Course – Web-based, Third-party | | C++ Skills: Expert | Supervisor | C++ Skills: Expert | 5 | Medium / Medium |
| 717 | XML Skills Training Curriculum | XML Skills Training Curriculum | Multi-Course Curriculum | | XML Skills: <Various> | | XML Skills: Intermediate | 40 | Medium / Medium |
| 719 | Product TT Proficiency | Overview Of Product Line UU | Seminar or Self-Study | | Product TT Proficiency | | | - | Low / Medium |
| 721 | Presentation At Organization's Tech Luncheon Series | | Experiential | | | | Public Speaking | - | Medium / Low |
| ... | | | | | | | | | |

*Fig. 7A*

Example Employee ZZ Personalized Learning Scheduling

My Recommended Learning

710

| Learning Activity | Associated Curriculum | Learning Type | Unfulfilled Prerequisites | Resulting Organization Competencies | Validation Needed | Related Competency Gaps | Gap Value | Value To Employee / Organization |
|---|---|---|---|---|---|---|---|---|
| ... | | | | | | | | |
| 715 C++ Expert-Level Online Course by Organization LL | - | Course – Web-based, Third-party | - | C++ Skills: Expert | Supervisor | C++ Skills: Expert | 5 | Medium / Medium |
| ... | | | | | | | | |

Training Catalog

730

| Learning Activity | Associated Curriculum | Learning Type | Prerequisites | Resulting Organization Competencies | Validation Needed | Start Date | Length | Price |
|---|---|---|---|---|---|---|---|---|
| 731 C++ Expert-Level Online Course by Organization LL | - | Course – Web-based, Third-party | Intermediate C++ Skills | C++ Skills: Expert | Supervisor | 06/01/XX | 6 weeks – M-W 1pm-3pm | $200 |
| 733 C++ Expert-Level Online Course by Organization LL | - | Course – Web-based, Third-party | Intermediate C++ Skills | C++ Skills: Expert | Supervisor | 08/01/XX | 6 weeks – M-W 1pm-3pm | $200 |
| 735 C++ Expert-Level Online Course by Organization LL | - | Course – Web-based, Third-party | Intermediate C++ Skills | C++ Skills: Expert | Supervisor | 09/01/XX | 8 weeks – M-F 8am-9am | $200 |
| ... | | | | | | | | |

*Fig. 7B*

Example Employee ZZ Personalized Learning Scheduling Update

My Current Competency Gaps

557 [New]  559 [Edit]

550

| | Competency Name | Parent Competency | Competency Category | Current Skill Level | Target Skill Level | Skill Gap Value | Planned Date Of Accomplishment | Criticality | Source |
|---|---|---|---|---|---|---|---|---|---|
| 552 | B.S. Degree | Education | Credentials | - | - | - | - | High | Current Work Position |
| 554 | C++ Skills | Progr. Skills | Skills | Intermediate | Expert | 5 | 10/31/XX | Medium | Performance Goal |
| | ... | | | | | | | | |

My Planned Competencies

560

| | Competency Name | Parent Competency | Competency Category | Planned Skill Level | Required Skill Level | Planned Date Of Accomplishment | Planned Basis Of Accomplishment | Competency Description |
|---|---|---|---|---|---|---|---|---|
| 562 | C++ Skills | Progr. Skills | Skills | Expert | Expert | 10/31/XX | Course Completion – Web-based, Third-Party + Supervisor Validation | C++ Programming |

*Fig. 7C*

Example Employee ZZ Personalized Learning Completion Update

My Current Skills 510
517  New  519 Edit

| | Skill Name | Parent Skill | Root Skill Category | Current Skill Level | Skill Gap | Required Skill Level | Date Of Accomplishment | Skill Description | Criticality |
|---|---|---|---|---|---|---|---|---|---|
| 512 | C++ Skills | Progr. Skills | Tech. Skills | Expert | No | Expert | 10/29/XX | C++ Programming | Medium |
| 514 | Spanish Reading | Spanish | Lang. Skills | Fluent | No | Conversant | 01/01/XY | Spanish Reading | Low |

Skill Level Change History For Selected Skill

530

| | Skill Name | Current Skill Level | Date Of Accomplishment | Accomplishment Basis | Validation | Employee Comments |
|---|---|---|---|---|---|---|
| 531 | C++ Skills | Expert | 12/29/XX | Course Completion – C++ Expert-Level Online Course by Organization LL | Supervisors: AA | |
| 532 | C++ Skills | Intermediate | 06/15/XX | Course Completion – Organization XX Intermediate C++ Skills Training | | Even before my course completion, my previous project experience provided the requisite skills. |
| ... | | | | | | |

My Current Competency Gaps

550

| | Competency Name | Parent Competency | Competency Category | Current Skill Level | Target Skill Level | Skill Gap Value | Planned Date Of Accomplishment | Criticality | Source |
|---|---|---|---|---|---|---|---|---|---|
| 552 | B.S. Degree | Education | Credentials | | | - | - | High | Current Work Position |
| 556 | HTML Skills | Web Skills | Skills | None | Basic | 20 | - | Low-Med | Manager Recommendation |
| ... | | | | | | | | | |

*Fig. 7D*

Example Future Career Path Management – Career Path Selection

Example Future Career Path Management – Competencies Comparison Screen

810 My Current Competencies

| Competency Name | Parent Competency | Competency Category | Current Skill Level | Competency Parameter | Date Of Accomplishment | Criticality |
|---|---|---|---|---|---|---|
| 812 C++ Skills | Progr. Skills | Tech. Skills | Intermediate | - | 06/15/XX | Medium |
| 814 A.A. Degree | Education | Credentials | - | Computer Studies | 02/01/XY | - |
| ... | | | | | | |

820 Competency Gaps For Starting Work Position Type: Intermediate Software Engineer

| Competency Name | Parent Competency | Competency Category | Skill Level Rating System | Required Skill Level | Date Required | Preferred Skill Level | Criticality |
|---|---|---|---|---|---|---|---|
| 822 B.S. Degree | Education | Credentials | - | - | Start Date | - | High |
| ... | | | | | | | |

830 Competency Gaps For Intermediate Work Position Type: Senior Software Engineer – ABC Division

| Competency Name | Parent Competency | Competency Category | Skill Level Rating System | Required Skill Level | Date Required | Preferred Skill Level | Criticality |
|---|---|---|---|---|---|---|---|
| 832 B.S. Degree | Education | Credentials | - | - | Start Date | - | High |
| 834 C++ Skills | Progr. Skills | Tech. Skills | N-I-E-G | Expert | Start Date | - | Medium |
| ... | | | | | | | |

840 Competency Gaps For Target Work Position Type: Director Of Engineering

| Competency Name | Parent Competency | Competency Category | Skill Level Rating System | Required Skill Level | Date Required | Preferred Skill Level | Criticality |
|---|---|---|---|---|---|---|---|
| 842 M.S. Degree or M.B.A. Degree | Education | Credentials | - | - | Start Date | - | Medium |
| ... | | | | | | | |

*Fig. 8D*

Example Manager Group Skill Management Screen – Current Competencies

910 — Group PP Enumerated Current Competencies And Competency Gaps

| | Competency Name | Current Skill Level | Competency Parameter | Current Number Of Group Members | Target Number Of Group Members | Gap | Average Date Of Accomplishment |
|---|---|---|---|---|---|---|---|
| 911 | C++ Skills | Expert | - | 2 | 3 | 1 | 04/15/XX |
| 913 | C++ Skills | Intermediate | - | 5 | 5 | 0 | 04/15/XX |
| 915 | C++ Skills | Basic | - | 2 | 1 | -1 | 04/23/XX |
| 917 | C++ Skills | - | - | 1 | 1 | 0 | - |
| 919 | B.S. Degree | - | Computer Science | 4 | 5 | 1 | 01/12/XY |
| | ... | | | | | | |

920 — Group PP Aggregated Current Competencies And Competency Gaps

| | Competency Name | Average Current Skill Level (0-3) | Target Current Skill Level (0-3) | Gap | Competency Parameter | Number Of Group Members | Average Date Of Accomplishment |
|---|---|---|---|---|---|---|---|
| 922 | C++ Skills | 1.8 (Almost Intermediate) | 2 (Intermediate) | 0.2 | - | 10 | 04/17/XX |
| | ... | | | | | | |

*Fig. 9A*

Example Manager Group Skill Management Screen – Target Competencies

930 ⎯ Group PP Enumerated Target Competencies And Resulting Competency Gaps
936 [New] 938 [Edit]

| | Competency Name | Current Skill Level | Competency Parameter | Current Number Of Group Members | Target Number Of Group Members | Gap | Average Anticipated Date Of Accomplishment |
|---|---|---|---|---|---|---|---|
| 931 | C++ Skills | Expert | - | 2 | 4 | 2 | 10/01/XX |
| 933 | C++ Skills | Intermediate | - | 5 | 5 | 0 | 10/01/XX |
| 935 | C++ Skills | Basic | - | 2 | 2 | 0 | 10/01/XX |
| 937 | C++ Skills | - | - | 1 | 0 | -1 | 10/01/XX |
| 939 | B.S. Degree | - | Computer Science | 4 | 5 | 1 | 08/30/XX |

950 ⎯ Group PP Aggregated Target Competencies And Competency Gaps
957 [New] 959 [Edit]

| | Competency Name | Average Current Skill Level (0-3) | Average Target Skill Level (0-3) | Gap | Current Number Of Group Members | Target Number Of Group Members | Average Anticipated Date Of Accomplishment |
|---|---|---|---|---|---|---|---|
| 952 | C++ Skills | 1.8 (Almost Intermediate) | 2.5 (Intermediate-Expert) | 0.7 | 10 | 11 | 04/17/XX |
| | ... | | | | | | |

*Fig. 9B*

Example Manager Group Skill Management Screen – Target Competencies

960 — Group PP Member Target C++ Skill Levels  966 [New] 968 [Edit]

| Member | Current Skill Level | New Target Skill Level | Gap | Anticipated Date Of Accomplishment | Target Type | Validation |
|---|---|---|---|---|---|---|
| Employee HH | Expert | Expert | No | - | - | - |
| Employee II | Expert | Expert | No | - | - | - |
| Employee ZZ | Intermediate | Expert | Yes | 08/15/XX | Performance Goal | Supervisors: |
| Employee JJ | Intermediate | Intermediate | No | - | - | - |
| Employee KK | Intermediate | Expert | Yes | 010/15/XX | Required | - |
| ... | | | | | | |

*Fig. 9C*

970 — Group PP Member Target C++ Skill Levels  976 [New] 978 [Edit]

| Member | Average Current Skill Level (0-3) | Average New Target Skill Level (0-3) | Gap | Current Number Of Group Members | Target Number Of Group Members | Anticipated Date |
|---|---|---|---|---|---|---|
| Sub-Group QQ | 1.9 | 2.3 | 0.4 | 7 | 8 | 08/15/XX |
| Sub-Group RR | 2.1 | 2.2 | 0.1 | 6 | 5 | - |
| ... | | | | | | |

*Fig. 9D*

Example Competency-Based Employee Searching

Search:

Competency: [C++ Skills ▽] With Skill Level: [Intermediate ▽] With Accomplishment Basis: [<Any> ▽]

With Accomplishment Date Between: [<Any>] & [04/01/XX] With Validation: [<Any> ▽] ...

And ● Or ○ And Not ○

Competency: [C++ Skills ▽] With Skill Level: [Basic ▽] With Accomplishment Basis: [Not Self-Assessment ▽]

With Accomplishment Date Between: [01/01/XY] & [<Any>] With Validation: [At Least Supervisor ▽] ...

And ● Or ○ And Not ○

Competency: [Leadership ▽] With Accomplishment Date Between: [<Any>] & [<Any>] ...

And ● Or ○ And Not ○

...

Search Results:

Employee BB
Employee ZZ
Employee CC

...

Rank By: Skill Level: ○  Accomplishment Basis: ○  Earliest Accomplishment Date: ●  Latest Accomplishment Date: ○ ...

*Fig. 10A*

Example Competency-Based Employee Search Result Comparison

1010 ╲ C++ Skill Level: Intermediate

| Employee | Date Of Accomplishment | Accomplishment Basis | Validation |
|---|---|---|---|
| Employee BB | 02/15/XX | Course Completion – Intermediate C++ Skills Training, Third-Party Web-based | Supervisors: FF |
| Employee ZZ | 03/01/XX | Self-Assessment | Supervisors: AA<br>Peers: BB, CC<br>Subordinates: DD |
| | 06/15/XX | Course Completion – Organization XX Intermediate C++ Skills Training | - |
| ... | | | |

1012
1014

1020 ╲ C++ Skill Level: Basic

| Employee | Date Of Accomplishment | Accomplishment Basis | Validation |
|---|---|---|---|
| Employee ZZ | 02/15/XY | Degree Completion – AA in Computer Studies | Supervisors: AA |
| Employee BB | 04/01/XY | Online Exam – Organization XX Basic C++ Skills Exam | Supervisors: FF |
| ... | | | |

Example Employee YY Competency Self-Assessment Validation

1110 — Validation Of Others' Proposed Self-Assessed Competencies

1117 [Edit]   1119 [Submit]

| | Competency Name | Parent Competency | Proposer | Relationship | Current Skill Level | Proposed Skill Level | Self-Assessment Comment | My Validation Rating | My Validation Comments |
|---|---|---|---|---|---|---|---|---|---|
| 1112 | Spanish Writing | Spanish | Employee ZZ | Peer – current project | 2 | 4 | - | 4 | - |
| 1114 | Public Speaking | Communication | Employee WW | Supervisor – 1 level | - | - | I have made 3 technical presentations to the department in the last year | No | From attending 2 of the presentations, you are improving but need additional work on pace and organization |
| | ... | | | | | | | | |

1120 — Skill Level Change History For Selected Competency

| | Competency Name | Skill Level | Date Of Accomplishment | Accomplishment Basis | Validation | Employee Comments |
|---|---|---|---|---|---|---|
| 1122 | Spanish Writing | 2 | 06/15/XY | Course Completion – Organization XX Spanish Writing Training Level 2 | | - |
| | ... | | | | | |

*Fig. 11A*

Example Supervisor AA Competency Self-Assessment Approval

Approval Of My Direct Reports' Proposed Self-Assessed Competencies

1137 [Edit]  1139 [Submit]

| Competency Name | Parent Competency | Proposer | Relationship | Current Skill Level | Proposed Skill Level | Self-Assessment Comment | My Approval | My Approval Comments |
|---|---|---|---|---|---|---|---|---|
| 1132 *Spanish Writing* | *Spanish* | *Employee ZZ* | *Subordinate – 1 level* | *2* | *4* | *-* | *yes* | *Almost unanimous validation from reviewers, and your work has been consistently good* |
| ... | | | | | | | | |

Details For Selected Proposed Self-Assessed Competency

| Skill Name | Proposed Skill Level | Skill Level Rating System | Date Of Skill Level Proposal Submission | Review Group | Validation Criteria | Review Status Details |
|---|---|---|---|---|---|---|
| 1142 Spanish Writing | 4 | 1-5 | 07/05/XX | Supervisor: 1 level Subordinates: 1 level Peers: current project | Supervisor Approval | Current Average Reviewed Skill Level: 3.93 Current Review Response Rate: 56% Current Review Comments: Employee YY – "I have seen three examples of his recent work product, and all have been very good" ... |

*Fig. 11B*

Example Employee ZZ Validated Self-Assessed Competency Update

510 My Current Skills

| | Skill Name | Parent Skill | Root Skill Category | Current Skill Level | Skill Gap | Required Skill Level | Date Of Accomplishment | Skill Description | Criticality |
|---|---|---|---|---|---|---|---|---|---|
| 512 | C++ Skills | Progr. Skills | Tech. Skills | Intermediate | Yes | Expert | 06/15/XX | C++ Programming | Medium |
| 514 | Spanish Reading | Spanish | Lang. Skills | High Fluent | No | Fluent | 01/01/XY | Spanish Reading | Low |
| 516 | Spanish Writing | Spanish | Lang. Skills | 4 | No | 3 | 07/06/XX | Spanish Writing | Low |
| | ... | | | | | | | | |

550 My Current Competency Gaps

| | Competency Name | Parent Competency | Competency Category | Current Skill Level | Target Skill Level | Gap Value | Planned Date Of Accomplishment | Criticality | Source |
|---|---|---|---|---|---|---|---|---|---|
| 554 | C++ Skills | Progr. Skills | Skills | Intermediate | Expert | 5 | - | Medium | Performance Goal |
| 558 | Public Speaking | Communication | Capabilities | - | - | - | - | Low | Personal Goal |
| | ... | | | | | | | | |

570 My Proposed Self-Assessed Skills

| | Skill Name | Parent Skill | Root Skill Category | Current Skill Level | Proposed Skill Level | Self-Assessment Comment | Hold? | Submitted Status | Validation Status | Validation Comments |
|---|---|---|---|---|---|---|---|---|---|---|
| 572 | Java Skills | Progr. Skills | Tech. Skills | Intermediate | Expert | I have 3+.... | Yes | No | - | - |
| 576 | Spanish Reading | Spanish | Lang. Skills | High Fluent | Fluent | While I .... | - | Yes | Pending | - |

*Fig. 11C*

COMPETENCY SELF-ASSESSMENT APPROVAL

CROSS REFERENCE TO RELATED APPLICATIONS

This application is a continuation-in-part of U.S. patent application Ser. No. 10/109,972, filed Mar. 29, 2002 and entitled "Managing Future Career Paths"; of U.S. patent application Ser. No. 10/112,420, filed Mar. 29, 2002 now abandoned and entitled "Using Skill Level History Information"; of U.S. patent application Ser. No. 10/109,858, filed Mar. 29, 2002 now abandoned and entitled "Managing Competencies Of Groups"; and of U.S. patent application Ser. No. 10/112,330, filed Mar. 29, 2002 now abandoned and entitled "Personalized Learning Recommendations", each of which is hereby incorporated by reference in its entirety.

TECHNICAL FIELD

The following disclosure relates generally to using competency-related information, and more particularly to providing automated assistance to gain approval of self-assessed competencies of individuals, such as for employees of an organization.

BACKGROUND

Many organizations track information about themselves and their members, and use that information for a variety of purposes. For example, business organizations will typically track payroll-related information about employees (e.g., their salaries and Social Security Numbers), and may also track other work-related information for at least some employees (e.g., their current work positions and various biographical information such as accomplishments and degrees). Organizations increasingly employ various software applications to assist in the tracking of such information, as well as with the managing of interactions between the organization and other parts of the enterprise (e.g., customers, partners, suppliers, distributors, employees, etc.).

While organizations will occasionally store limited information about the competencies of their members (e.g., a list of members that are trained in CPR or that speak a particular foreign language), such organizations do not typically track and use such information in an organized and integrated manner so as to provide significant benefits to the organization or to its members. For example, organizations do not typically track a full range of competencies of differing types for it members, nor do they typically track a history of changes in members' competencies. Moreover, organizations do not typically track missing competencies that have been identified for members, nor use such information to assist the members in improving their current competencies.

In some organizations, members may be able to supply limited information about their own competencies, and in some circumstances such member-supplied information may be available to others. However, member-supplied information that merely represents a subjective assessment by a member of their own competencies may be of little use to others. For example, others will have difficulty in determining whether the member-supplied information suffers from unintentional or intentional inaccuracies. Moreover, even if each member provides self-assessment information about their competencies that they believe to be accurate, it will be difficult for others to compare members' relative self-assessed competencies, as each member may use different descriptions for similar competencies (e.g., "public speaking" versus "oral communication ability"), may use different rating types (e.g., one member using ratings of "low", "medium" and "high", while another member uses a scale from 1 to 5) and/or may correlate similar abilities to different rating levels.

Accordingly, it would be beneficial to track a variety of competency-related information for individuals such as members of organizations, and to use such information to provide various benefits to the individuals and/or organizations. For example, it would be beneficial to provide mechanisms for gathering self-assessed competency information from individuals in a standardized manner and for independently approving such self-assessment information in various ways.

BRIEF DESCRIPTION OF THE DRAWINGS

FIGS. 5A-5D illustrate examples of competency-related information that can be tracked and used for employees of a business organization.

FIGS. 6A-6B illustrate examples of competency-related information that is defined for an organization.

FIGS. 7A-7D illustrate examples of receiving and using personalized learning recommendations.

FIGS. 8A-8E illustrate examples of using competency-related information as part of career path management activities.

FIGS. 9A-9D illustrate examples of managing the competencies of a group of multiple employees.

FIGS. 10A-10B illustrate an example of searching for employees using competency-related information and comparing employees based on such information.

FIGS. 11A-11C illustrate examples of approving an employee's proposed self-assessed competencies.

DETAILED DESCRIPTION

I. Introduction

Figure 1:
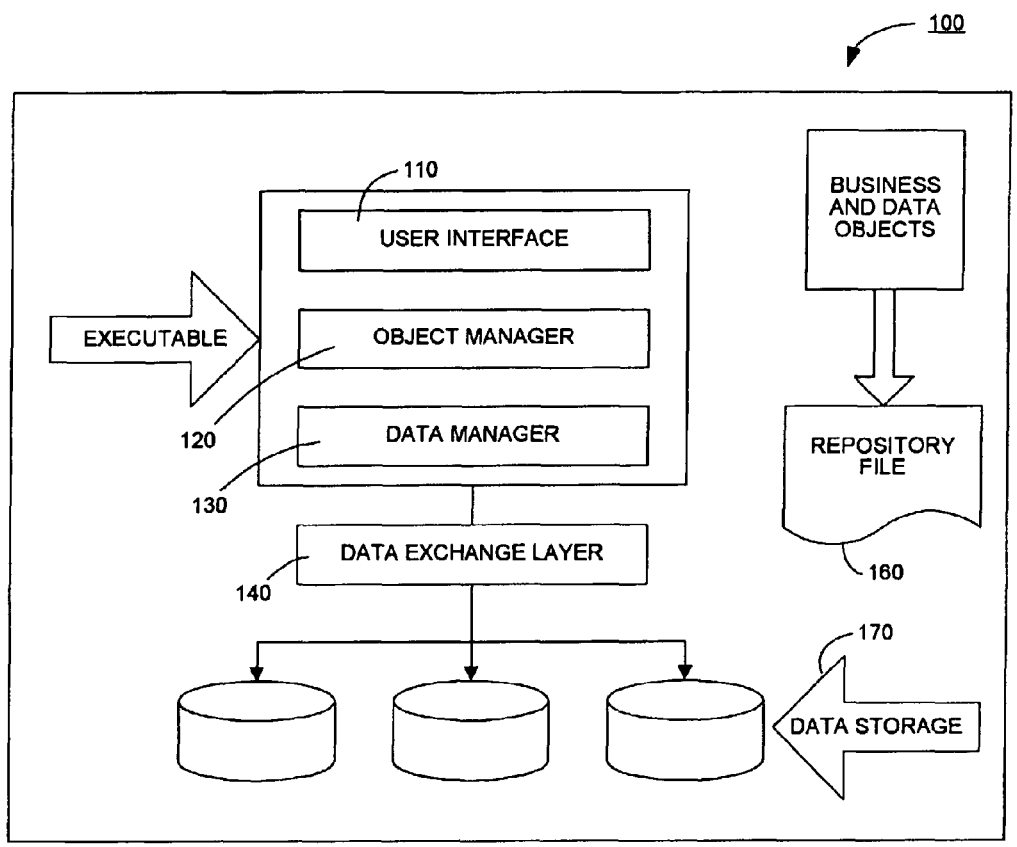
FIG. 1 shows a multi-layered system architecture within which the described techniques can be implemented.

A software facility is described below that tracks various competency-related information for individuals and uses such competency-related information to provide a variety of benefits. In some embodiments, the individuals are members of an organization (e.g., employees of a business organization), and the software facility is used by the organization to provide a variety of benefits to the organization and its members.

In particular, in some embodiments individuals may propose self-assessments of competencies that they believe that they possess, such as specified skill levels (or "proficiency levels") of specified skills. The accuracy of individuals' self-assessments can be enhanced and validated in various ways. For example, a defined rating system with multiple defined skills levels (e.g., with corresponding descriptions) can be associated with a specified competency, thus improving the relative accuracy of individuals' self-assessments for that competency. In addition, various techniques to independently approve proposed self-assessed competencies can be provided, such as by defining approval groups of appropriate validation reviewers (e.g., supervisors, peers and/or subordinates) for self-assessed competencies and by automatically retrieving and processing validation information from such reviewers upon receipt of a proposed competency self-assessment. The types of validation information from reviewers may vary in different embodiments and/or based on the specific approval group or reviewer, any may include various types of validation assessments (e.g., a "yes/no" assessment, or an independent assessment of the current skill level of an individual who is proposing a skill level for a competency) that are to be combined with the validation assessments of other users in order to make an approval determination, an explicit approval assessment from a single reviewer to approve or deny a proposed competency, validation opinions to be provided to one or more other reviewers who will actually provide assessments, etc. Various approval criteria for a proposed competency self-assessment can also be specified, such as a favorable validation assessment from a majority of reviewers, unanimously favorable validation assessments by some or all of the specified reviewers, and/or using a threshold that an average of the reviewers' assessed skill levels for the proposing individual must reach. In addition, in some embodiments approval of a proposed self-assessed competency may be based on independent verification, such as in an automated manner by computer-based testing of a proposer's knowledge or other testable skill.

In some embodiments, a history of changes that occur in individuals' competencies is also tracked, such as new competencies that are attained by the individuals and/or changes in skill levels for existing competencies. A variety of additional information related to such competency changes may also be determined and tracked, such as times at which the changes occurred and/or a basis for each of the competency changes (e.g., completion of a course that provided a resulting competency or an approved self-assessment of a new skill level). The competency change history information can then be used to provide a variety of benefits. For example, when such competency change information is tracked for members of an organization, it can be used by others to more accurately identify members of interest (e.g., members who have had a specified current skill level of a competency for at least a specified period of time and who attained a specified prior skill level of that competency by completion of an appropriate training course) and/or to compare such members (e.g., to rank members having a specified current skill level of a competency based on the length of time that they have had that skill level and/or on the basis for their achieving of that skill level).

In addition, in some embodiments gaps are identified between current competencies of individuals and target competencies for those individuals, and the individuals are provided with assistance in reducing or eliminating those competency gaps. The target competencies for an individual can be identified in a variety of ways, such as in an automatic manner based on required or preferred competencies for a current organizational position held by an individual. After identifying one or more competency gaps for an individual, the facility can automatically identify training courses or other learning activities that if completed or performed by the individual would reduce or eliminate those competency gaps. The facility can also automatically detect the completion or performance of at least some such learning activities by individuals (e.g., training courses provided by an organization of which the individual is a member), and if so will automatically update the current competency information and resulting competency gap information for those individuals.

In some embodiments, target competencies for members of an organization are identified at least in part based on information specified by appropriate other members of the organization (e.g., supervisors or group managers). For example, a manager of a group in an organization can specify aggregate target competencies for the group, and can view information about resulting competency gaps for the group. The facility can then assist the manager in generating a plan to reduce the group competency gaps in various ways, such as by identifying particular group members that are responsible for reducing or eliminating at least portions of the competency gaps and/or by searching for new potential group members whose current or planned competencies would similarly reduce or eliminate such competency gaps.

The competency-related information tracked by the facility can also assist members of an organization in managing future career paths within the organization. For example, in some embodiments the organization will have one or more defined networks of related position types for that organization, with an appropriate defined network indicating the future position types to which a current position type can lead. Thus, an organization member can specify a starting position type (e.g., the position type of the current position of the member) and a target future position type, and the facility can identify one or more possible career paths that lead from the starting position type to the target future position type (e.g., through one or more intermediate position types). When the position types have associated required competencies, the facility can also identify the competency gaps that exist for the member relative to each position type along the career path and/or between each pair of adjacent position types along the career path. After competency gaps are identified, actions to reduce those competency gaps can be identified for possible inclusion in a future action plan for the member. The facility can also provide other career management functionalities, including identifying other position types to consider (e.g., based on current or planned competencies of the member), providing links to openings for positions of future position types as the member becomes qualified for them, and providing various other types of information about future position types.

II. System Overview and Overall Architecture

In one embodiment, a computing system with which the facility is integrated can be logically structured as a multi-layered architecture as shown in FIG. 1. In particular, the logical multi-layered architecture as shown in FIG. 1 provides a platform for common services to support various applications. These services may include a user interface layer 110, an object manager layer 120, a data manager layer 130, and a data exchange layer 140.

The user interface layer 110 may provide the applets, views, charts and reports associated with one or more applications. In one embodiment, various types of clients can be supported via the user interface layer 110. These various types of clients may include traditional connected clients, remote clients, thin clients over an intranet, Java thin clients or non-Windows-based operating systems, HTML clients over the Internet, etc.

The object manager layer 120 may be designed to manage one or more sets of business rules or business concepts associated with one or more applications and to provide the interface between the user interface layer 110 and the data manager layer 130. In one embodiment, the business rules or concepts can be represented as business objects. The business objects may also be designed as configurable software representations of the various business rules or concepts, such as accounts, contacts, opportunities, service requests, solutions, etc.

The data manager layer 130 may be designed to maintain logical views of the underlying data and to allow the object manager to function independently of underlying data structures or tables in which data are stored. In one embodiment, the data manager 130 may also provide certain database query functions such as generation of structure query language (SQL) in real-time to access the data. In one embodiment, the data manager 130 is designed to operate on object definitions in a repository file 160 that define the database schema. The data storage services 170 provide the data storage for the data model associated with one or more applications.

The data exchange layer 140 may be designed to handle the interactions with one or more specific target databases and to provide the interface between the data manager layer 130 and the underlying data sources.

Figure 2:
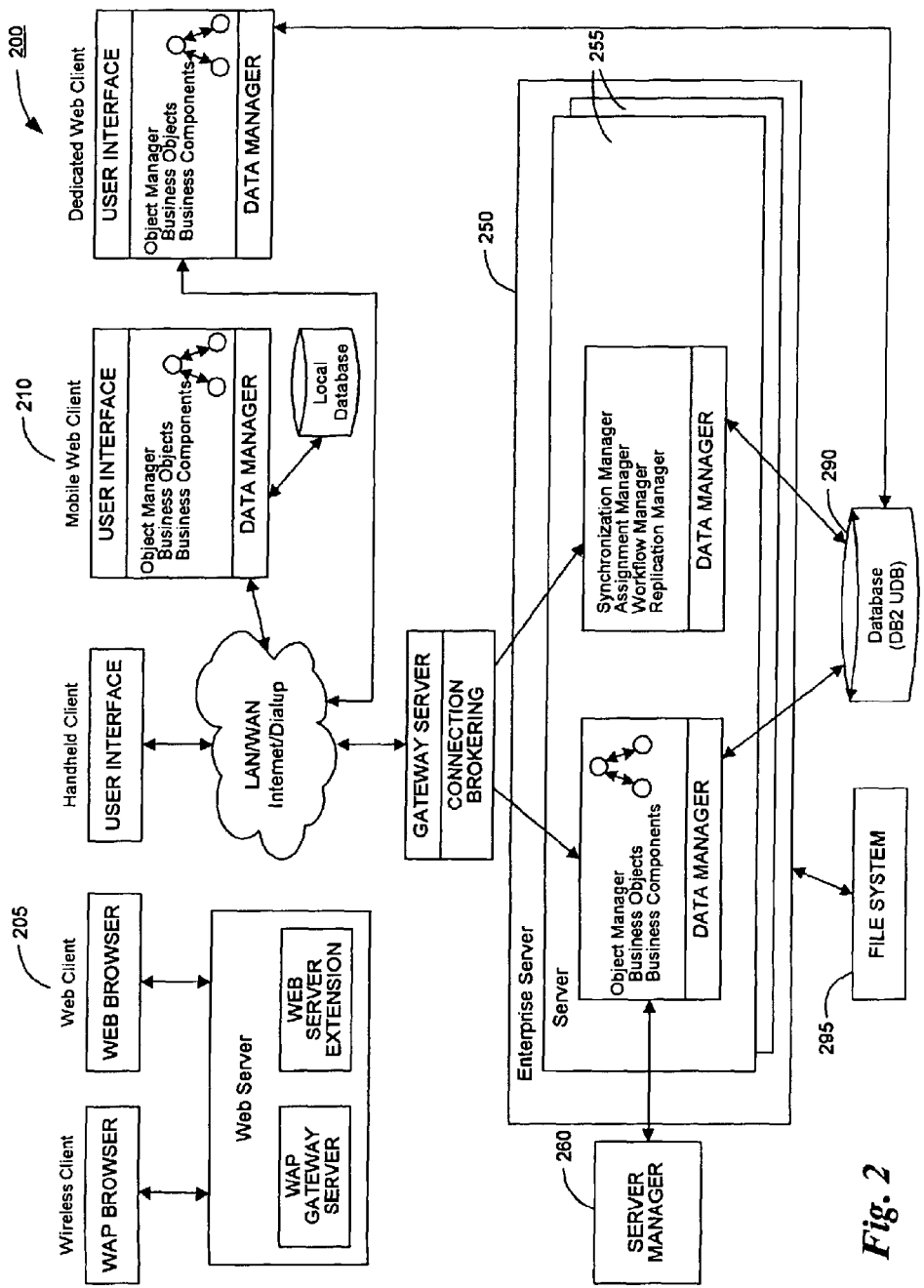
FIG. 2 shows a block diagram of one embodiment of a system configuration in which the described techniques can be implemented.

FIG. 2 shows a block diagram of one embodiment of a computing system configuration in which the facility can operate. In particular, the illustrated multi-layered architecture allows one or more software layers to reside on different machines. For example, the user interface, the object manager, and the data manager may all reside on the dedicated Web clients. For other types of clients such as the wireless clients, the object manager and data manager may reside on a system server. It should be appreciated and understood by one skilled in the art that the system configuration shown in FIG. 2 is for illustrative and explanative purposes, and may vary depending upon the particular implementations and applications of the described techniques.

In one embodiment, the system environment illustrated in FIG. 2 may include more than one database 290, and one or more subsets of the database can be created or replicated by a replication manager. In addition, mobile Web clients can have additional remote databases (also called local databases). In one embodiment, unless the remote or local databases associated with the mobile Web clients are defined as read-only databases, these mobile Web clients can create and update data locally that will be ultimately propagated up to the primary database when each mobile Web client synchronizes with the system server.

In one embodiment, the database 290 is designed to store various types of data including predefined data schema (e.g., table objects, index objects, etc.), repository objects (e.g., business objects and components, view definitions and visibility rules, etc.), and users' and customers' data. Dedicated Web clients and server components, including those that operate in conjunction with the other types of clients, may connect directly to the database 290 and make changes in real-time. In addition, mobile Web clients may download a subset of the server's data to use locally, and periodically synchronize with the server database through the system server to update both the local and the server database.

In some embodiments, various tables included in the database 290 may be logically organized into the following types: data tables, interface tables, and repository tables, etc. In addition, data tables may be used to store user business data, administrative data, seed data, and transaction data, etc. In one embodiment, these data tables may be populated and updated through the various applications and processes. Data tables may also include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:
the client application configuration;
the mapping used for importing and exporting data; and
rules for transferring data to mobile clients.

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated Web clients can read and write files directly to and from the file system 295. In one embodiment, mobile Web clients can have a local file system, which they synchronize with the server-based file system 290 periodically. In one embodiment, other types of client such as the wireless clients and the Web clients can access the file system 290 via the system server.

In one embodiment, the enterprise server 250 is a logical grouping of the system servers 255 that share a common table owner or a database, point to a common gateway server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile Web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers, individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing functions such as directing client connection requests to an appropriate server (e.g., the least-busy server).

In one embodiment, as illustrated in FIG. 2, the various types of clients that can be supported by the system may include the following clients: dedicated Web clients, mobile Web clients, Web clients, wireless clients, and handheld clients, etc.

In one embodiment, dedicated Web clients (also called connected clients) are connected directly to a database server for data access via a LAN or WAN connection. In one embodiment, these connected or dedicated Web clients do not store data locally. These dedicated Web clients can also access the file system directly. In one embodiment, the user interface, the object manager, and the data manager layers of the multi-layered architecture reside on the dedicated Web client.

In one embodiment, the mobile Web clients are designed and configured for local data access and thus can have their own local database and/or local file system. In one embodiment, mobile Web clients can interact with other components within the system via the gateway server. Through synchronization, the modifications from the local database and the server database can be exchanged.

In one embodiment, a Web client runs in a standard browser format from the client's machine. In one embodiment, the Web client can connect to a system server 255 through a Web server. In one embodiment, the system server 255 is designed and configured to execute business logic and access data from the database 290 and file system 295. In one embodiment, the Web client described herein is designed and configured to operate in an interactive mode. In one embodiment, the interactive Web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc.

In one embodiment, wireless clients are essentially thin clients enabled on wireless devices. The wireless clients can use a wireless application protocol (WAP)-based user interface to communicate and exchange information/data with the system server.

Figure 3:
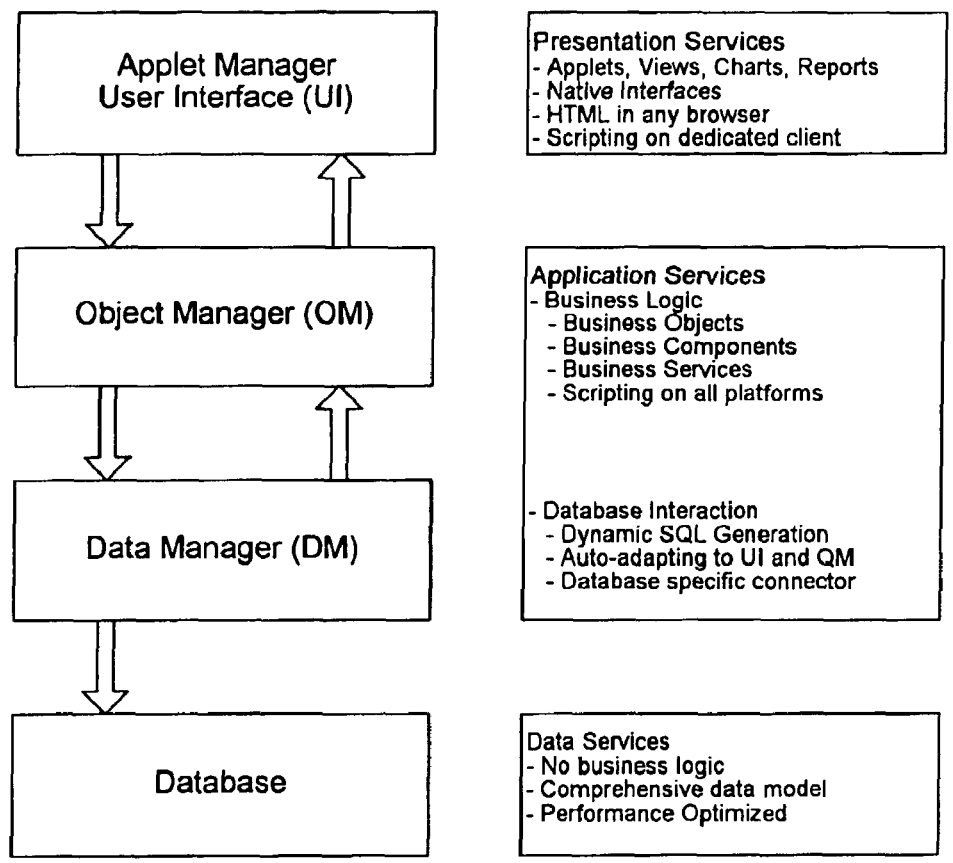
FIG. 3 shows a block diagram illustrating a logical representation of a multi-layered architecture within which the described techniques can be implemented.

FIG. 3 shows a block diagram illustrating another logical representation of a multi-layered architecture. Again, the multi-layered architecture as illustrated in FIG. 3 provides the configured platform for various common services designed and to support the various applications. In one embodiment, these various services may include presentation services which correspond to an applet manager and user interface layer, application services which correspond to an object manager (OM) layer and a data manager (DM) layer, and data services which correspond to a database layer.

In one embodiment, the presentation services may be designed and configured to support various types of clients and may provide them with user interface applets, views, charts, and reports, etc. As described above, a large variety of clients may be supported including wireless clients, handheld clients, Web clients, mobile Web clients, and dedicated (connected) clients, etc.

In one embodiment, the application services may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries) necessary to satisfy the request. For example, the data interaction services may be used to translate a call for data into DBMS-specific SQL statements.

In one embodiment, data storage services may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
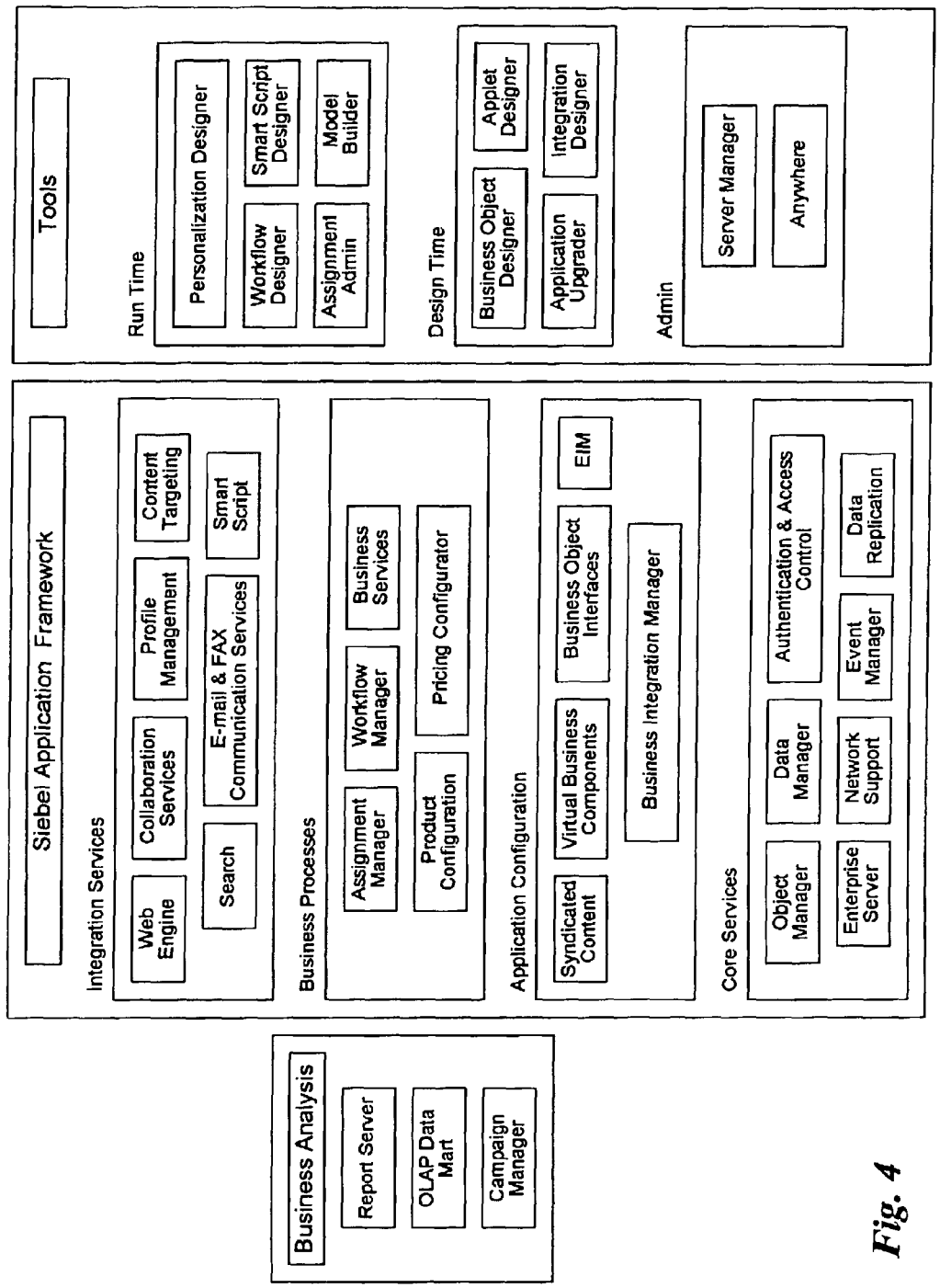
FIG. 4 illustrates a block diagram of one embodiment of an application framework within which the described techniques can be implemented.

FIG. 4 illustrates a block diagram of one embodiment of an application framework. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:

the enterprise server, which is the middle-tier application server;

the networks that link all of these pieces together;

facilities like event manager and data replication, which allow sharing data between multiple installations of various applications as well as between the various applications and other external applications; and the authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information and a server having information requested from it.

In one embodiment, business processes services are designed and configured to allow the client to automate business processes through the application. In one embodiment, these various business process services may include the following:

assignment of tasks through Assignment Manager;

enforcement of business practices through Workflow Manager;

reuse of custom business logic through Business Services; and ensuring proper product configuration and pricing through the Product Configurator and Pricing Configurator.

In one embodiment, creation of these business processes can be done through Run-Time tools such as Personalization Designer, Workflow Designer, SmartScript Designer, Assignment Administration Views, the Model Builder, etc.

In one embodiment, integration services may be designed and configured to provide the client with user interface and thin client support. In one embodiment, these may include capabilities for building and maintaining Web-based applications, providing Web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured to provide one place to monitor and administer the application environment. In one embodiment, these services allow the user to administer the application either through a graphic user interface (GUI) or from a command line.

III. Examples and Additional Details

For illustrative purposes, some embodiments of the software facility are described below in which specific types of competencies are tracked and used by employees of business organizations. However, those skilled in the art will appreciate that the techniques of the invention can be used in a wide variety of other situations, and that the invention is not limited to use with employees of business organizations or with the illustrated types of competencies.

As one example of competency-related information that may be tracked and used for employees of a business organization, consider the information illustrated for an example Employee ZZ of an Organization XX in FIGS. 5A-5C. In the illustrated embodiment, Organization XX makes a variety of information available to employees via a Web-based portal for the organization, and Employee ZZ has selected to review his competency-related information. As is shown in section 505 of the resulting screen of information, in this illustrated example Employee ZZ holds a current work position within the organization that has the unique identifier of 2347, with that work position being of a defined work position type for the organization of "Intermediate Software Engineer". There are also various other sections of competency-related information for Employee ZZ that are illustrated on the screen, including a section 510 illustrating current skills, a section 520 illustrating details about a selected one of the current skills, a section 530 indicating history information for skill level changes for that selected skill, a section 540 indicating non-skill competencies of the employee, a section 550 indicating current competency gaps of the employee, a section 560 indicating planned competencies of the employee, a section 570 indicating proposed self-assessed skills of the employee, and a section 580 illustrating details about a selected one of the proposed self-assessed skills. Those skilled in the art will appreciate that in other embodiments additional types of information may be presented (e.g., proposed self-assessments of non-skill competencies) and/or that some of the illustrated types of information may not be available.

To provide a context for the competency-related information presented in FIGS. 5A-5C, FIG. 6A illustrates an example of various defined competencies that have been previously specified for the organization. In particular, in the illustrated embodiment an administrative user (or "administrator") for the organization has defined a competency hierarchy 600 for the organization, such as by modifying a default competency hierarchy provided by a third-party. The hierarchy in the illustrated embodiment can be defined to any depth desired by the administrative user. While competencies may be represented in a variety of ways, in the illustrated embodiment the competencies are hierarchically arranged in at least four competency groupings, those being a group 602 of various skills, a group 604 of various capabilities, a group 606 of various credentials, and a group 608 of various experiences. Competencies are selected to be grouped with the skills if they are attributes that have multiple corresponding skill levels amenable to measurement. Capabilities, conversely, are qualities which a person is determined to possess or not possess, but do not have multiple associated skill levels. Credential and experience competencies similarly do not have multiple associated skill levels, but may have associated parameters in the illustrated embodiment (e.g., a Masters of Science degree credential could have an associated parameter indicating the field of study or an associated class rank). Those skilled in the art will appreciate that competencies can be defined in other ways in other embodiments (e.g., a competency categorized as a capability for one organization could be categorized as a skill for another organization, or other organizations may not differentiate between different types of competencies in this manner), and can include a variety of types of information not illustrated or instead may lack some of the illustrated information.

In the illustrated embodiment, after specifying the competency hierarchy, an administrative user then assigns competency-related information to defined work positions and to learning activities that are available to employees. More generally, each business organization may have a variety of work position types that have been defined for the organization, with multiple filled work positions and work position openings sharing a single defined work position type. Each work position type can have one or more associated competencies, which in the illustrated embodiment can be defined as being required or preferred. In addition, for each competency associated with a work position type that is a skill, there is also a corresponding rating system having multiple defined skill levels (e.g., "Novice", "Intermediate" and "Expert", or integers 1-5) that is associated with that work position type. While not illustrated here, in some embodiments an administrative user may define an arbitrary number of rating systems with arbitrary skill levels, and associate any combination of skill and rating system to any work position type. In addition, while also not illustrated here, in some embodiments particular work positions of a defined type may be defined to have associated competencies that vary from the competencies associated with the defined type, such as defining a competency that is merely preferred for the defined type to be required for a particular work position.

FIG. 6B illustrates an example screen with which an administrative user may define mappings of competency-related information to work position types, including a section 610 with various defined work position types for the organization and a section 620 with additional details about a selected one of the work position types. In particular, section 610 of FIG. 6B illustrates various defined work position type entries 612-616, and includes summaries of required and preferred competencies for each work position type. The illustrated embodiment also includes information about a location of the work position type in a corresponding hierarchy of work position types (not illustrated), such as may be used for inheritance or sharing of associated competency information (e.g., some of the associated competencies for the work position type of "Senior Software Engineer—ABC Division" may be inherited from its parent work position type of "Senior Software Engineer"). Section 610 also includes interactive controls 617 and 619 to allow the administrative user to add new work position types or to edit existing ones.

The work position type illustrated in entry 614 has been selected (illustrated in this example embodiment by the entry being shown in italicized form), and thus the section 620 provides additional details about the competencies mapped to that work position type. Four competencies are shown for the selected work position type in entries 622-626, with each entry providing information about the position of that competency in the defined competency hierarchy as well as a corresponding criticality of the competency for the work position type. For the competencies that are skills, a skill level rating system is also specified, and a required and/or preferred skill level from that rating system is also shown for the skill. Section 620 also includes interactive controls 627 and 629 to allow the administrative user to add or edit competencies for the selected work position type. Those skilled in the art will appreciate that in other embodiments a variety of additional types of competency-related information could be specified and/or shown, or that various illustrated types of information may instead not be specified and/or shown.

While not illustrated, the administrator can also associate competencies and rating systems (for skill-based competencies) with each of various learning activities available to employees, and can then specify skill levels that are expected to result from or possibly result from performance or completion of the learning activities by employees. Such learning activities can take a variety of forms, as discussed in greater detail below, including training courses and exams offered by the organization as well as learning activities provided by a known third-party, such as over the Web. Administrators can also specify a variety of other types of information related to learning activities, such as various prerequisites for a learning activity and/or multiple learning activities to be associated together (e.g., in a specified order) as a curriculum.

While not illustrated, the administrator can also define various information related to approval of self-assessed competencies. For example, approval groups of one or more appropriate validation reviewers (e.g., supervisors, peers and/or subordinates) may be defined and used for providing validation or other information related to proposed self-assessments of competencies. In some situations, the validation reviewers may be independent of the particular employee proposing a self-assessment (e.g., a fixed committee or individual within an organization), while in other situations some or all of the reviewers may instead be determined relative to the proposing employee (e.g., by selecting the supervisor of the employee to be a reviewer). In addition, in some embodiments an approval group may be selected for use with a proposed competency self-assessment from an employee on the basis of one or more of various factors, such as the particular competency, the particular employee, a work position type of the employee, a group of employees that includes the particular employee (e.g., employees that are part of a project or within a division), etc.

The administrator may also define other approval information for proposed self-assessed competencies, such as various types of approval criteria to be used to determine whether to approve a proposed self-assessed competency. As with the defined approval groups, approval criteria may be selected for use with a particular competency self-assessment from an employee based on one or more of various factors, including the particular competency, the particular employee, etc. In some circumstances, approval for a proposed self-assessed competency can be automatically determined after validation information is received from one or more reviewers, such as if the approval criteria specifies a threshold for the number of validation reviewers that must validate the proposed competency (e.g., a majority of the reviewers from which responses are solicited, or a majority of the reviewers from which responses are received) in order for it to be approved and/or specifies a threshold for the validation assessments of the various reviewers (e.g., an average, accumulation or other aggregation of the assessment responses) in order for it to be approved. In other circumstances, the defined approval criteria allows one or more validation reviewers (e.g., a supervisor of an employee) to explicitly provide an approval assessment to approve or deny a self-assessed competency, such as based on their own experience or after reviewing validation opinions received from other reviewers. Alternatively, the approval criteria may be able to determine approval in an automated manner even without validation or other information from reviewers.

Figure 6A:
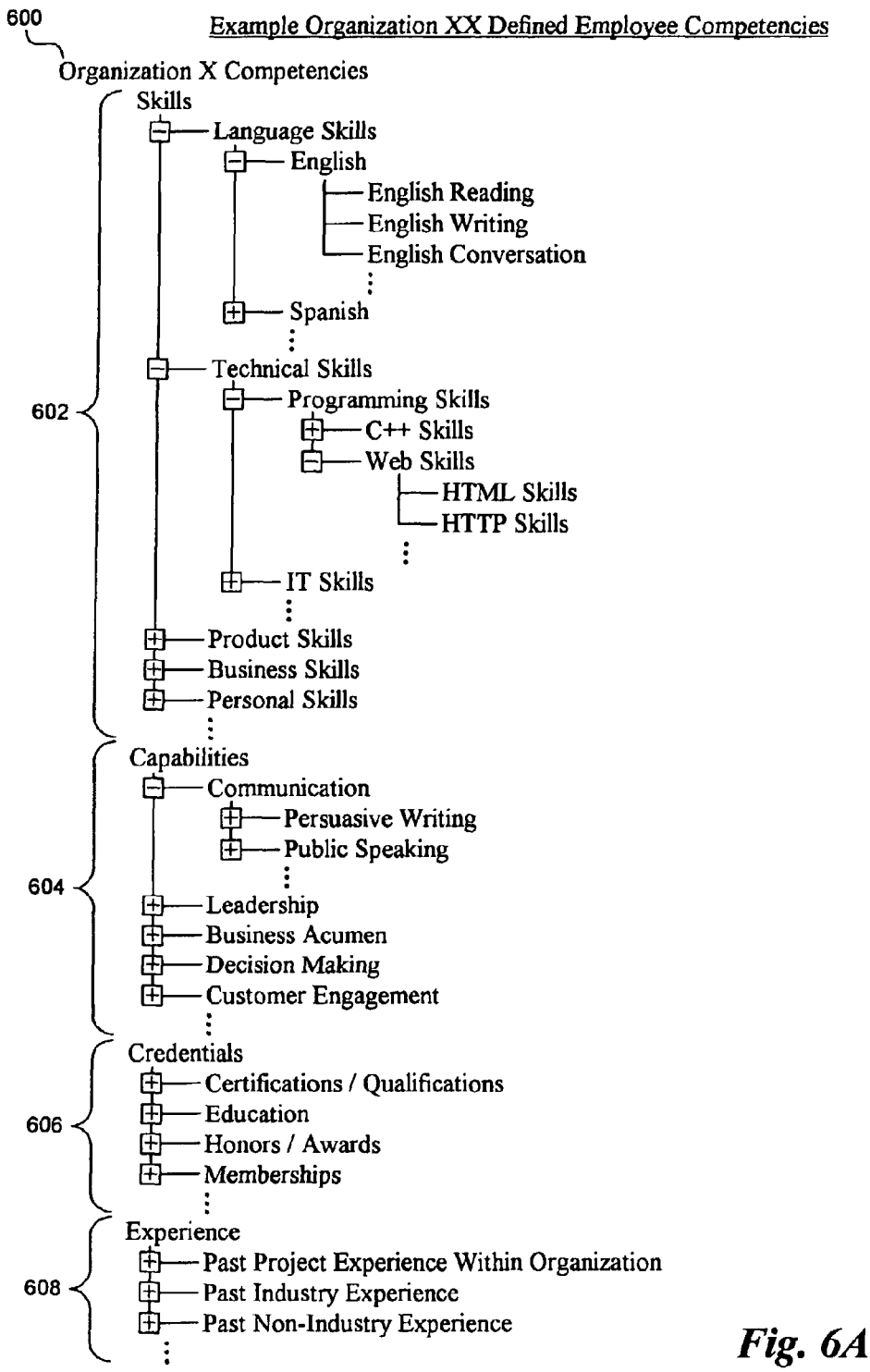
Figure 6C:
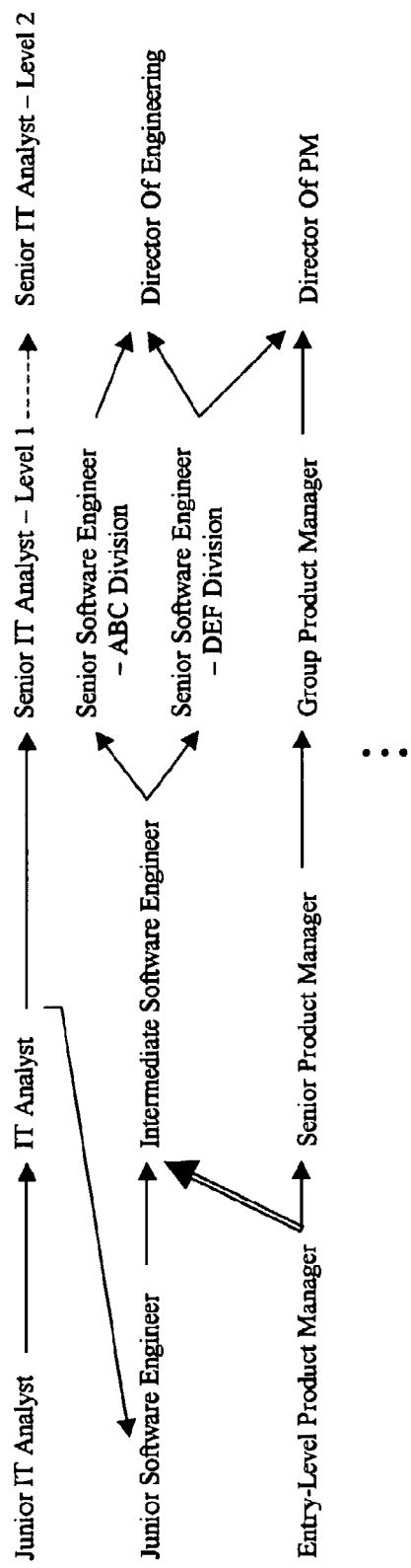
FIG. 6C illustrates an example of a network of related work position types that is defined for an organization.

In addition to the previously described definitions, an administrative user in the illustrated embodiment can also define one or more networks of relationships between work position types. FIG. 6C illustrates an example of a portion of a work position type network for the engineering portion of the organization. A variety of work position types are illustrated, and arrows are shown to indicate defined relationships between those work position types. Most relationships in the illustrated embodiment, shown here with an arrow with a single solid line, indicate that employees in a work position of a defined type are eligible to be promoted to positions of other defined work position types if arrows to those other work position types are shown from the first work position type. Thus, for example, in the illustrated embodiment an employee having a position of the defined "Junior IT Analyst" work position type is eligible to be promoted to a next work position type of "IT Analyst", but not to a next work position type of "Junior Software Engineer". As is shown, some work position types may have multiple alternatives for next work position types, such as the "Intermediate Software Engineer" type. A variety of interactive controls (not shown) may also allow an administrative user to add work position types and define relationships.

In addition, in the illustrated embodiment an administrative user can specify additional types of restrictions between work position types. For example, employees with a current work position of the type "Entry-Level Product Manager" are eligible to be promoted to the engineering-track work position of the type "Intermediate Software Engineer", but only if they receive approval of the appropriate Director of Engineering. The existence of this additional restriction for that work position type transition is shown in the illustrated embodiment by an arrow with double lines. As another example, the "Senior IT Analyst—Level 1" work position type is intended to be a final work position type from which there is not a regular career path advancement track. However, a select few employees in that position may eventually be elevated to the "Senior IT Analyst—Level 2" work position type if they are selected by a special review panel. The existence of this special work position type transition is shown in the illustrated embodiment by an arrow with a dashed line. Those skilled in the art will appreciate that in other embodiments, no additional restrictions may be imposed for work position type transitions other than the competencies associated with the future work position type, or that a variety of other types of restrictions may be imposed.

Returning now to FIG. 5A, a variety of competency-related information for Employee ZZ will now be discussed. As previously noted, section 510 includes various skill-based competency information for Employee ZZ. In particular, skills are shown in entries 512-516, and the skill in entry 512 with the name "C++ Skills" has been selected. Section 510 also includes interactive controls 517 and 519 in the illustrated embodiment to allow Employee ZZ to modify his own skill set, although in some embodiments some modifications (e.g., additions of new skills or skill levels) may need validation or other approval before taking effect. Some or all of the skills may also have associated criticality values, such as to show the importance of the possession of the skill to the employee (e.g., based on the current work position type) and/or to the organization.

Section 520 illustrates additional details for the selected skill, including not only a current skill level of Employee ZZ but also information about the achievement of that skill level. The skill level achievement information in the illustrated embodiment includes the date on which the skill level was achieved and a basis for the employee to have been rated as having that skill level, which in this example was completion of a course provided by Organization XX. In this example, the completed internal course was previously defined by an administrative user as providing an Intermediate skill level for the "C++ Skills" competency and as not requiring any additional validation. In addition, information such as the date of accomplishment and accomplishment basis was automatically added in this example to Employee ZZ's competency-related information upon completion of the course, such as by receiving that information from a learning module for the organization.

A history of skill level changes is also tracked for at least some skills in the illustrated example, and section 530 shows a skill level change history for the selected skill. Entries 532-536 of the section each show a previous change that occurred with respect to the skill for Employee ZZ. For example, Employee ZZ first attained a Basic skill level for the selected skill by completing an A.A. degree and then receiving a validation approval from his supervisor as possessing the Basic skill level. After later completing an internal project for Organization XX, Employee ZZ believed his skill level had progressed to a Intermediate level, and thus performed a corresponding self-assessment that was later approved by appropriate other employees in a 360 degree review that included supervisors, peers and subordinates. However, as Organization XX places a higher value on skills that are attained via courses than they do for those attained via self-assessments, Employee ZZ later completed an internal course that further validated his possession of an Intermediate skill level for the skill.

Section 540 summarizes a variety of non-skill competency information for Employee ZZ, which in other embodiments may be stored and/or presented in other manners (e.g., in a format more closely resembling a resume, or by separating credential, experience and capability information). While not illustrated, in some embodiments one of the competencies may be selected in a manner similar to that for the current skills, and corresponding additional details and/or competency change information may be presented for the selected competency. Section 540 also includes interactive controls in a similar manner to section 510. In other embodiments, information about skills and other competencies may be stored and/or presented in an integrated manner.

Section 550 provides a variety of information about current competency gaps for Employee ZZ, with those gaps based on target competencies for Employee ZZ that are not among the current competencies of Employee ZZ. In this example, four competency gaps in entries 552-558 are illustrated. As shown by the Source field, such competency gaps (and their corresponding target competencies) can have a variety of sources, including required skills for Employee ZZ's current work position, performance or other goals set for Employee ZZ (e.g., as part of a yearly review process), explicit recommendations or requirements from his manager or others (e.g., of a useful skill that he might want to consider, such as to benefit himself and/or to provide additional aggregate skills to a group to which Employee ZZ belongs), and personal interests or goals of Employee ZZ that have been specified. In the illustrated embodiment, each competency gap has an associated criticality value, with the competency gaps presented in a ranked order based on those criticality values. These criticality values can be determined in a variety of ways, such as by being provided by the source of the competency gap (e.g., the "B.S. Degree" competency being a requirement for Employee ZZ's current work position with a High level of criticality), based on the source itself (e.g., Personal Goals having by default a Low criticality), etc.

Section 560 provides information about planned competencies of Employee ZZ, such as based on learning activities that have been scheduled, explicit competency goals that have been set, or a defined plan to reduce current competency gaps. In this example, Employee ZZ does not currently have any planned competencies.

Section 570 illustrates various proposed self-assessments of skills by Employee ZZ. In particular, three proposed self-assessed skills are shown in entries 572, 574 and 576, with the "Spanish Writing" skill in entry 574 currently selected. Various interactive controls 573, 575 and 577 are present in the illustrated embodiment to allow Employee ZZ to modify his proposed self-assessed skills. In embodiments in which the employee can propose self-assessed skills directly, interactive controls in other skill-related sections (e.g., section 510) may be restricted so as to disallow self-assessment of skills in those sections. Each of the proposed self-assessed skills in section 570 includes a proposed skill level, and the employee can also provide self-assessment comments that will be available to validation reviewers. The illustrated embodiment also includes a "hold?" field that allows a proposed self-assessed skill to be temporarily excluded from an automated approval process that is initiated in the illustrated embodiment when the employee selects the "Submit" interactive control 579— thus, proposed self-assessments will be submitted for approval unless they have the "hold?" field currently selected or are already being approved. The proposed skills in entries 574 and 576 have already been submitted for approval, and a variety of information about the approval process may be provided to the employee in the illustrated embodiment as is shown in the "Approval Status" and "Approval Comments" fields for entry 574. In some embodiments, some available information about the approval process may be restricted from the employee, such as the identity of specific validation reviewers or the individual validation assessment responses received from particular reviewers.

Section 580 illustrates additional details for the selected proposed self-assessed skill, including information about the approval group of validation reviewers and the approval criteria to be used for the approval process. In the illustrated embodiment, the approval group includes 2 levels of supervisors (i.e., Employee ZZ's supervisor and the supervisor's supervisor), 1 level of subordinates (e.g., the direct reports of Employee ZZ) and Employee ZZ's peers that are part of Employee ZZ's current project. In addition, the illustrated approval criteria includes a threshold for the number of validation reviewers that are required to respond (i.e., 75%), for the types of reviewers that must respond (i.e., at least one peer, one supervisor and two subordinates), and for the validation assessment provided by the responses in order for the proposed competency to be approved. In this example, as is illustrated in greater detail with respect to FIG. 11A, each of the reviewers can provide a validation assessment of Employee ZZ's current skill level for the selected skill, and the provided skill level assessments are then averaged. A weighting scheme for the averaging is also used in this example, with the supervisor's assessment carrying twice the weight as a subordinate's assessment. Additional details about the current status of the approval process are also illustrated, although identifications of particular validation reviewers that have responded and their particular skill level assessments is not available to Employee ZZ. Those skilled in the art will appreciate that approval groups and approval criteria can be specified in a variety of ways, and that in other embodiments the approval process may be defined in other manners.

Figure 5D:
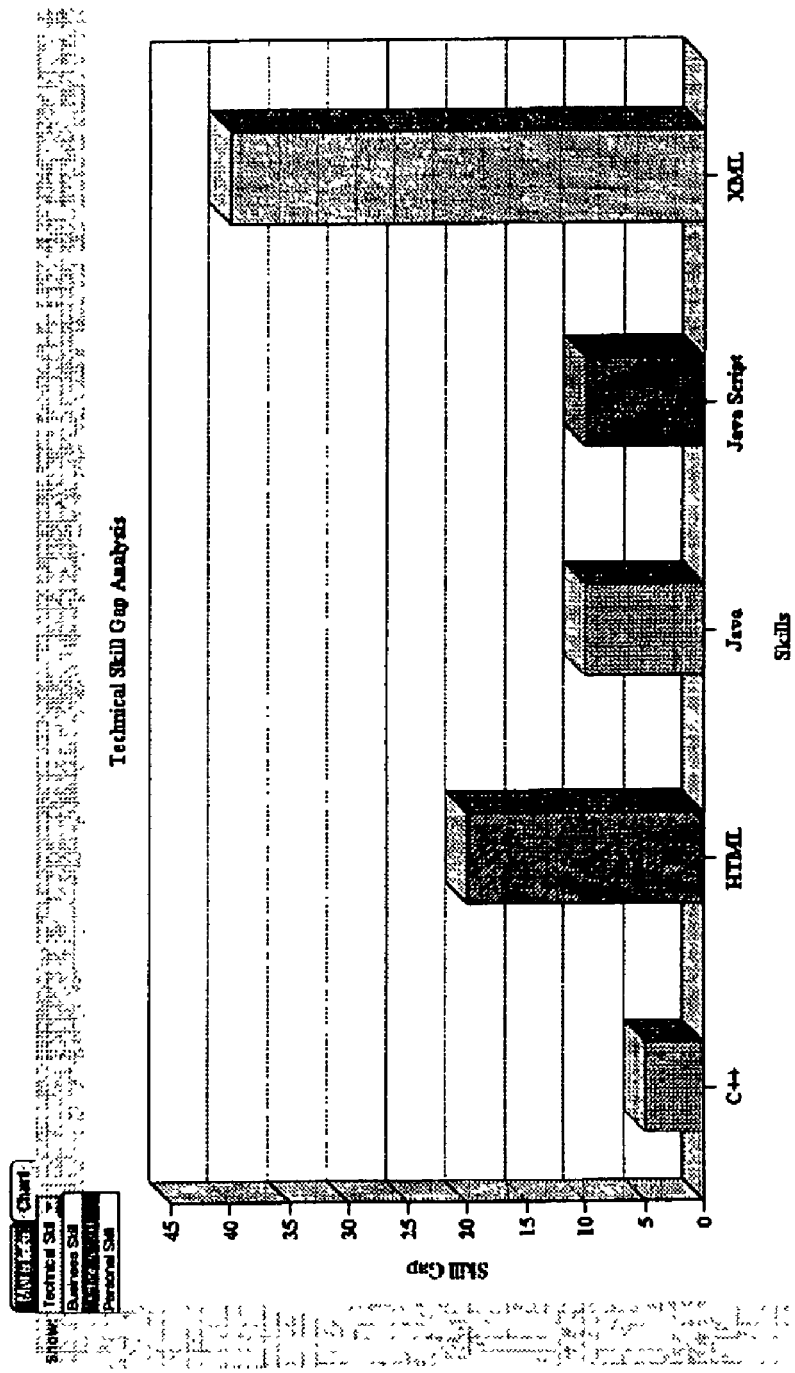

FIG. 5D illustrates an alternative view of competency gap information for Employee ZZ, with the illustrated example focusing on technical skill gaps. As an alternative to presenting competency gap information in a table format ranked by criticality, such a chart can provide information showing a degree or amount of a gap relative to some performance measure, such as a defined requirement or a comparison to other comparable employees (e.g., those having work positions of the current or a future work position type). While not illustrated, a variety of interactive controls may also be provided to allow Employee ZZ to manipulate and modify the chart.

FIGS. 7A-7D illustrate examples of Employee ZZ receiving and using personalized learning recommendations. In particular, with respect to FIG. 7A, Employee ZZ is presented with a variety of learning recommendations illustrated in entries 711-721 of section 710, such as in response to a request for such information. In the illustrated embodiment, the personalized learning recommendations are based on gaps between Employee ZZ's current competencies and various target competencies that have been identified for him. For example, entries 711-715 correspond to a competency gap between Employee ZZ's current skill level of "Intermediate" for the "C++ Skills" competency and a target skill level of "Expert" for that competency, with the entries providing different options that can each be used by Employee ZZ to eliminate that competency gap. The learning activities can be of various types (e.g., courses internal to Organization XX, courses external to the organization, exams, self-study, experiential activities that provide learning by doing, etc.), and in the illustrated embodiment various related information such as unfulfilled prerequisites and associated curriculums is shown. As the learning activity in entry 711 has an unfulfilled prerequisite, in the illustrated embodiment it is displayed in a manner so as to differentiate it from the other entries (in a shaded or dimmed manner in this example) and is not selectable by Employee ZZ. In the illustrated embodiment, each of the learning activities also has associated values to the employee and the organization that can be determined in a variety of ways (e.g., based on the corresponding competency gaps and the importance of the source of those gaps), and the illustrated learning activities are ranked in the order of those values.

As is illustrated in FIG. 7B, Employee ZZ has selected the learning activity training course shown in entry 715 as a potential activity to be performed, and in response the system provides a variety of corresponding training catalog information in section 730 of the screen. In particular, information about particular upcoming instances of the selected training course are shown. In this example, the course instance shown in entry 731 conflicts with one or more other scheduled activities of Employee ZZ (e.g., based on information stored in his calendar or schedule), and thus that course instance is illustrated in a distinct manner from the course instances that do not have a conflict. After reviewing the illustrated information, Employee ZZ determines that he will take the course instance shown in entry 735, and selects that entry for registration.

After Employee ZZ has completed the scheduling of the course instance, various competency-related information for Employee ZZ is automatically updated. For example, as is shown in FIG. 7C, the planned competencies of Employee ZZ are updated to reflect the new competency that is expected to result from the scheduled training course, including a planned accomplishment date for the new competency based on the schedule for the course.

FIG. 7D provides an example of how competency-related information for Employee ZZ is automatically updated after completion of the training course. In particular, Employee ZZ's current skills are updated to show the new "Expert" skill level for the "C++ Skills" competency, and the skill level change history information is updated in a corresponding manner to show the date and basis for the new skill level. In addition, the previously existing competency gap for Employee ZZ based on the lack of the "Expert" skill level has now been eliminated. In this example, validation from Employee ZZ's supervisor AA was required to confirm the new competency, and so that validation was automatically solicited from that supervisor upon completion of the training course. After that validation was received, the illustrated changes to Employee ZZ's competency-related information take effect.

FIGS. 8A-8E illustrate examples of Employee ZZ performing career path management activities that use various competency-related information. In particular, with respect to FIG. 8A, Employee ZZ is presented with a network of work position types that begins with the current work position type of Employee ZZ (in this example, "Intermediate Software Engineer"), such as in response to a request for such information. In some embodiments, a variety of interactive controls (not shown) will be provided, such as to select a starting work position type for career planning purposes that is different from the current work position type of Employee ZZ.

Figure 8A:
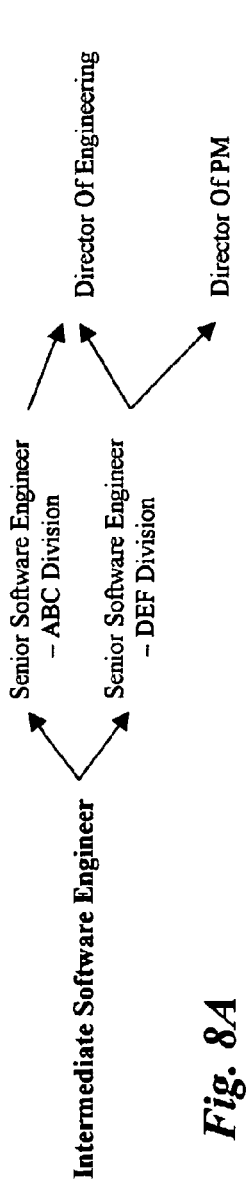
Figure 8B:
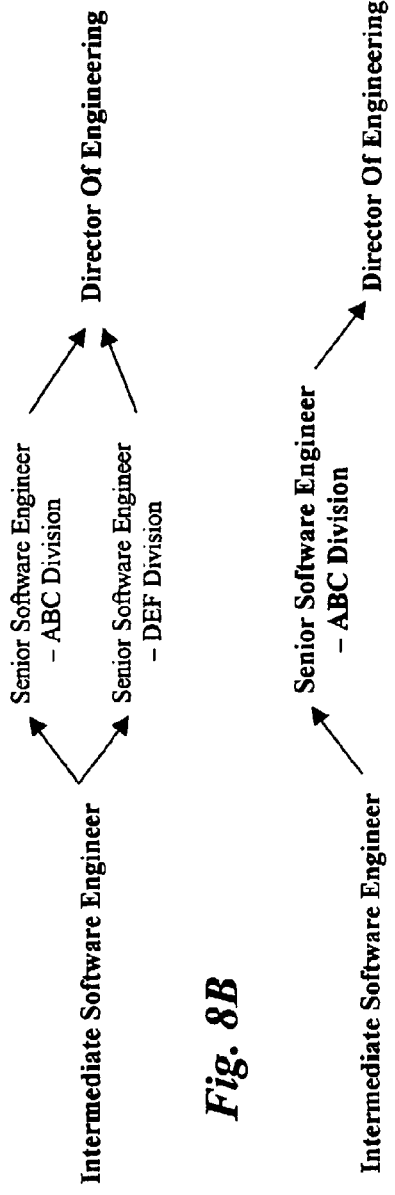
Figure 8C:

As shown in FIG. 8B, in this example Employee ZZ selects the work position type of "Director Of Engineering" as a possible goal for a future target work position type. In response to that selection, the system in the illustrated embodiment determines the possible career paths from the starting work position type to the selected target work position type, and displays those possible career paths. In this example, two such possible career paths are available. In FIG. 8C, Employee ZZ then selects one of the two possible career paths, and in response the system presents a variety of competency-related information for that selected career path in FIG. 8D.

In particular, in this example the system presents information in FIG. 8D about competency gaps for Employee ZZ for each of the work position types along the selected career path. The illustrated competency gap screen includes a section 810 that shows existing competencies for Employee ZZ, and sections 820, 830 and 840 illustrate competency gaps for Employee ZZ corresponding to each of the three work position types along the selected career path. For example, section 820 illustrates competency gaps between Employee ZZ's current competencies and the required competencies for Employee ZZ's current work position type. As would be expected, the competency gaps increase in section 830 when the requirements for the next work position type along the career path are considered, and further increase in section 840 when the requirements for the final target work position type at the end of the selected career path are considered.

Figure 8E:
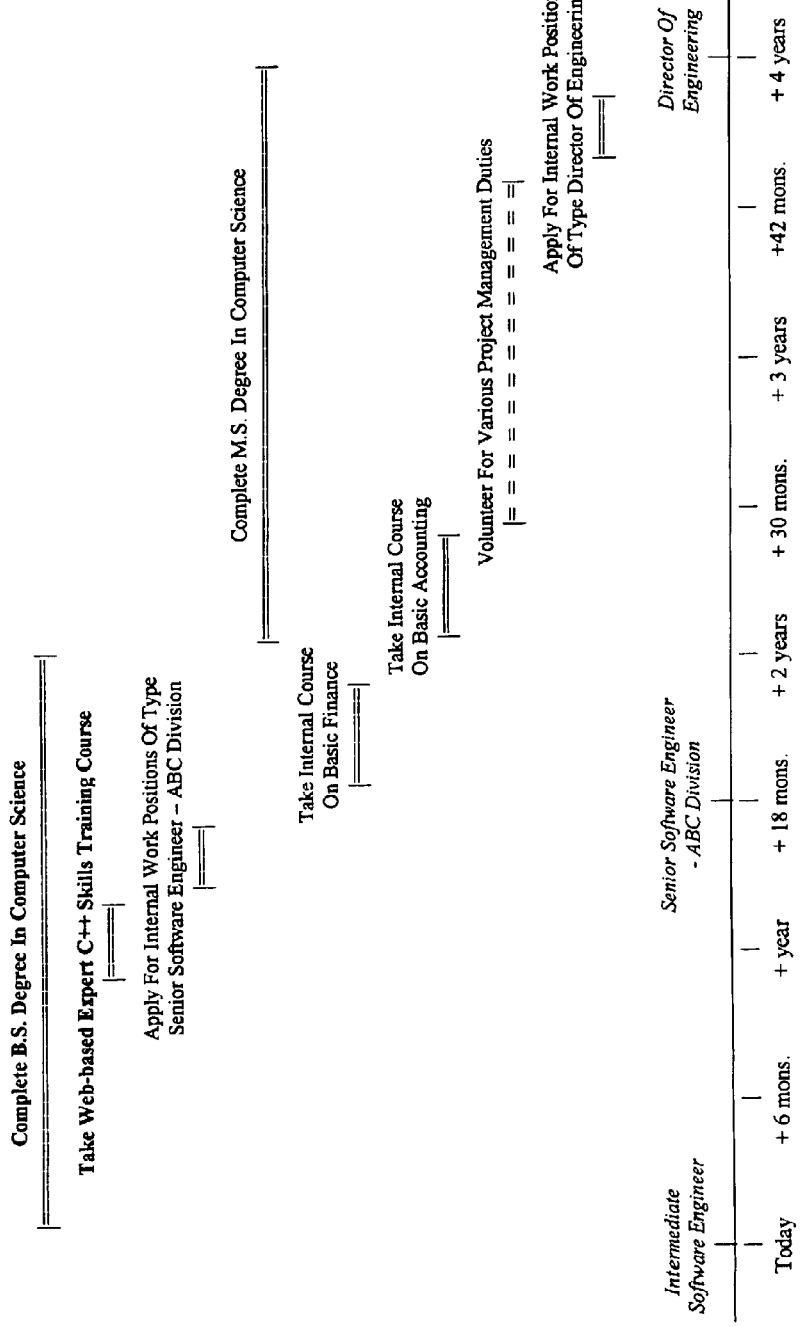

After presenting the competency gap information to Employee ZZ, the system then assists Employee ZZ in developing an action plan to manage his future career so as to be qualified for the target work position type within a specified period of time. In particular, FIG. 8E illustrates a time-based action plan that includes suggestions for a variety of actions over time that will eliminate or reduce the competency gaps along the career path. In the illustrated embodiment, the system also ranks the actions according to importance for Employee ZZ, and provides indications of the most important actions (illustrated here in bold format). For example, the first two suggested actions are to complete a B.S. degree and to achieve an "Expert" skill level for the "C++ Skills" competency, as both of those would eliminate significant competency gaps for the next work position type along the career path. After achieving the "Expert" skill level and mostly completing the degree, the system recommends that Employee ZZ begin applying for internal work positions of type "Senior Software Engineer—ABC Division", with the plan being for Employee ZZ to receive such a position within 18 months from the current time.

In addition to merely suggesting actions that eliminate competency gaps, the system can also suggest additional actions that would improve the chances or opportunities of Employee ZZ to be offered a work position type along the career path, such as for gaining business-related skills and project management experience in preparation for a work position as a "Director Of Engineering". As with other such functionalities provided to users, in an least some embodiments a variety of interactive controls will also be provided to allow Employee ZZ to modify the suggested action plan and/or to create a different action plan.

FIGS. 9A-9D illustrate examples of managing the competencies of a group of multiple employees. In particular, in the illustrated example a manager of a Group PP having multiple employees can view various information about the current competency-related information for the group. For example, as shown in section 910, in some embodiments the manager may view enumerations of each competency held by at least one group member, as well as information such as the number of group members that possess that competency and an average date on which those group members achieved that competency. Section 920 provides a different view of group competency information by aggregating the competency information for the various group members together and providing a summary view of the group competency information. For example, in this illustrated embodiment information is aggregated about all of the different skill levels for the "C++ Skill" competency that are held by the group members, and an aggregated average skill level value (based on assigning integers 0-3 to skill levels "None", "Basic", "Intermediate" and "Expert") for that competency is calculated.

In addition to viewing information about current competencies of the group, sections 910 and 920 also provide information about current target competencies for the group and about competency gaps that result from differences between the current actual competencies and the current targets. The current target information in the illustrated embodiment also includes targets for numbers of group members that should have a specified competency (e.g., 3 group members having an "Expert" skill level for the "C++ Skills" competency) as well as targets for an average skill level for a specified skill.

While not illustrated here, in some embodiments the manager can also view detailed competency-related information for each of the group members, such as the information illustrated with respect to FIGS. 5A-5C. Similarly, the manager may be able to perform career path management activities for each of the group members, and provide corresponding recommendations to the member, such as of future work position types to consider and/or of target competencies that would help prepare the group member for future work position types.

FIG. 9B illustrates that the manager can also explicitly specify target information for the group, and view information about the competency gaps that would result between the current group competencies and those specified target competencies. As with the existing competency and competency gap information, this specified target information can include values for enumerated competencies, for aggregate competencies, and/or for numbers of group members.

After target information has been specified, FIGS. 9C and 9D provide examples of ways in which the manager can act to reduce or eliminate competency gaps that result from the specified target information. In particular, FIG. 9C corresponds to a situation in which the members of the group are employees (e.g., for a first-level group in an organizational hierarchy), and in which summary information is illustrated for each of the group members for a specified competency or competency gap (in this example, for the "C++ Skills" competency). As shown in FIG. 9B, in this example a gap exists for group members that possess an "Expert" skill level for the competency, with the group being short two such members. In order to eliminate this competency gap, the manager reviews competency-related information for the group members, and specifies the "Expert" skill level as a target competency for two group members that do not currently possess that skill level (in this example, Employees ZZ and KK, as shown in entries 965 and 969 of section 960). In this manner, the manager distributes (or "rolls down") the required competencies to selected group members in such a manner that it becomes the responsibility of those group members to each satisfy the portion of the required competency that was given to them and to thus reduce or eliminate the corresponding competency gap.

FIG. 9D illustrates a situation similar to that illustrated in FIG. 9C, but in which some or all of the group members are themselves groups (e.g., for a higher-level group in an organizational hierarchy). As with group members that are individuals, the manager can distribute portions of the target competencies and their corresponding competency gaps to the group members. However, since the group members receiving the target competencies are themselves groups, those target competencies can be further distributed to the members of those groups. In the illustrated embodiment, this further distribution can be performed by the higher-level manager that initiated the original distribution, or instead by a lower-level manager that is responsible for the sub-group that received distributed target competency information.

FIGS. 10A-10B illustrate an example of searching for employees using competency-related information and of comparing employees based on such information. In particular, as illustrated in FIG. 10A, any of the competency-related information for individuals that was previously discussed can be used as the basis of a search, such as various skill level history change information (e.g., accomplishment basis and/or accomplishment date) for current or previous skill levels. When multiple employees are found to match the search criteria, they can be presented in various ways, such as in a ranked manner based on a variety of criteria. In the illustrated embodiment, interactive controls are illustrated that can be used to re-rank search results based on a specified ranking criteria.

FIG. 10B illustrates one example of multiple individuals being compared based on their competency-related information, such as some or all of the individuals that are identified as part of the search results for a search. In the illustrated embodiment, for each of the competencies used as part of the search, information for each of the various employees that was identified during the search is presented in a ranked manner for that competency. Full competency information for some or all of the employees could also be retrieved and displayed, and multiple employees can be compared in a variety of other ways.

FIGS. 11A and 11B illustrate examples of approval processes for a proposed self-assessed competency from an employee. For example, FIG. 11A corresponds to an approval process in which multiple validation reviewers are each asked to independently assess the skill level of the employee for the specified competency, with the skill level assessment responses then combined in an automated determination as to whether the appropriate approval criteria for the proposed self-assessed competency has been satisfied. Conversely, FIG. 11B corresponds to an automated approval process in which a single validation reviewer is asked to provide an approval assessment as to whether to approve or deny a proposed self-assessed competency, such as after considering validation opinions provided by other reviewers.

In particular, FIG. 11A illustrates a portion of a user interface screen that may be presented to an Employee YY who is a validation reviewer for Employee ZZ's proposed self-assessment for the "Spanish Writing" competency (based on Employee YY being a peer of Employee ZZ on a current project). The illustrated screen includes a section 1110 to allow Employee YY to provide validation information for other employees' proposed competency self-assessments, with entry 1112 corresponding to Employee ZZ's proposed competency self-assessment and entry 1114 corresponding to a self-assessed competency proposed by the supervisor of Employee YY. As noted, Employee YY can view Employee ZZ's current and proposed skill ratings as well as any provided self-assessment comments, and can supply his/her own validation assessment of Employee ZZ's skill level for the competency as well as optional comments (e.g., to be provided to Employee ZZ and/or to other reviewers). After Employee YY selects the "Submit" interactive control 1119, the validation information that he/she provided will then be available to the automated approval process.

FIG. 11A also illustrates a section 1120 that provides a skill level change history for a selected one of the proposed self-assessed competencies, which in this example is Employee ZZ's proposed "Spanish Writing" competency. In other embodiments, additional or alternative information may be available to validation reviewers, such as information about other reviewers' validation information for this proposed self-assessed competency, additional details about this proposed self-assessed competency (e.g., details about the skill-level rating system for the competency or about the approval group and/or approval criteria for the proposed self-assessed competency), other information about the employee who is proposing the self-assessed competency (e.g., other competencies), information about approvals and denials of other previous proposed self-assessed competencies for this employee and/or other employees, etc. In addition, validation reviewers may be notified of validation requests in manners other than by adding such information to a UI screen such as is illustrated (e.g., via email or a pop-up notification) and may be able to respond using that other notification mechanism or another mechanism that is distinct from updating a UI screen in the illustrated manner.

As previously noted, FIG. 11B corresponds to an automated approval process in which a single validation reviewer is asked to provide an approval assessment for a proposed self-assessed competency. In this example, the validation reviewer is the supervisor of Employee ZZ (Supervisor M) and is asked to determine whether to approve Employee ZZ's proposed self-assessment for the "Spanish Writing" competency. Such an approval process may be used in conjunction with the type of process illustrated in FIG. 11A (e.g., to provide validation opinions of others to Supervisor M for him/her to consider when making his/her decision) or may be used instead of gathering validation information from multiple reviewers. The illustrated portion of a user interface screen includes a section 1130 to allow Supervisor M to specify approval assessments of proposed competency self-assessments from his/her direct reports, with selected entry 1132 corresponding to Employee ZZ's proposed competency self-assessment. In a similar manner to section 1110, Supervisor M can view Employee ZZ's current and proposed skill ratings as well as any provided self-assessment comments, and can supply his/her approval or denial of Employee ZZ's proposed skill level as well as optional comments (e.g., to be provided to Employee ZZ). After Supervisor M selects the "Submit" interactive control 1139, the approval assessment will then be used to update Employee ZZ's competency-related information accordingly, as discussed in greater detail below with respect to FIG. 11C. In the illustrated embodiment, FIG. 11B also includes a section 1140 that provides additional details for the selected proposed self-assessed skill, including information about any validation opinions received from other reviewers. In other embodiments, a variety of additional information may be available to Supervisor M, or instead some of the illustrated types of information may not be available.

After the self-assessed competency proposed by Employee ZZ has been approved, various competency-related information for Employee ZZ is automatically updated. For example, as is shown in FIG. 11C, the proposed self-assessed skills in section 570 are updated to remove the approved self-assessment, and the current skills of Employee ZZ in section 510 are updated to reflect the new skill level for the competency. The skill level history for the skill will also be updated (not shown) to reflect the change in the skill level. In addition, since the approved skill level eliminates a competency gap that had previously existed for Employee ZZ with respect to the "Spanish Writing" competency, the competency gap information in section 550 is updated to remove the competency gap previously illustrated in entry 556. Various other changes may similarly be made based on the change (e.g., updating an action plan for the employee).

While not illustrated, a variety of updates may also occur if a proposed self-assessed competency is denied. For example, the employee may be notified of the denial via information added to section 570 (e.g., in the "Validation Status" field of the entry for that self-assessment) and/or in another manner (e.g., via email or a pop-up notification). In addition, the employee may be able to obtain detailed information about the basis for the denial, and may be able to develop an action plan (e.g., to gain the proposed competency in another manner such as via a learning activity, or to instead improve his/her chances of having a later proposed self-assessment for the competency be approved). In some embodiments there may also be an appeal or re-submittal process if the employee believes that the denial occurred in error.

Figure 12:
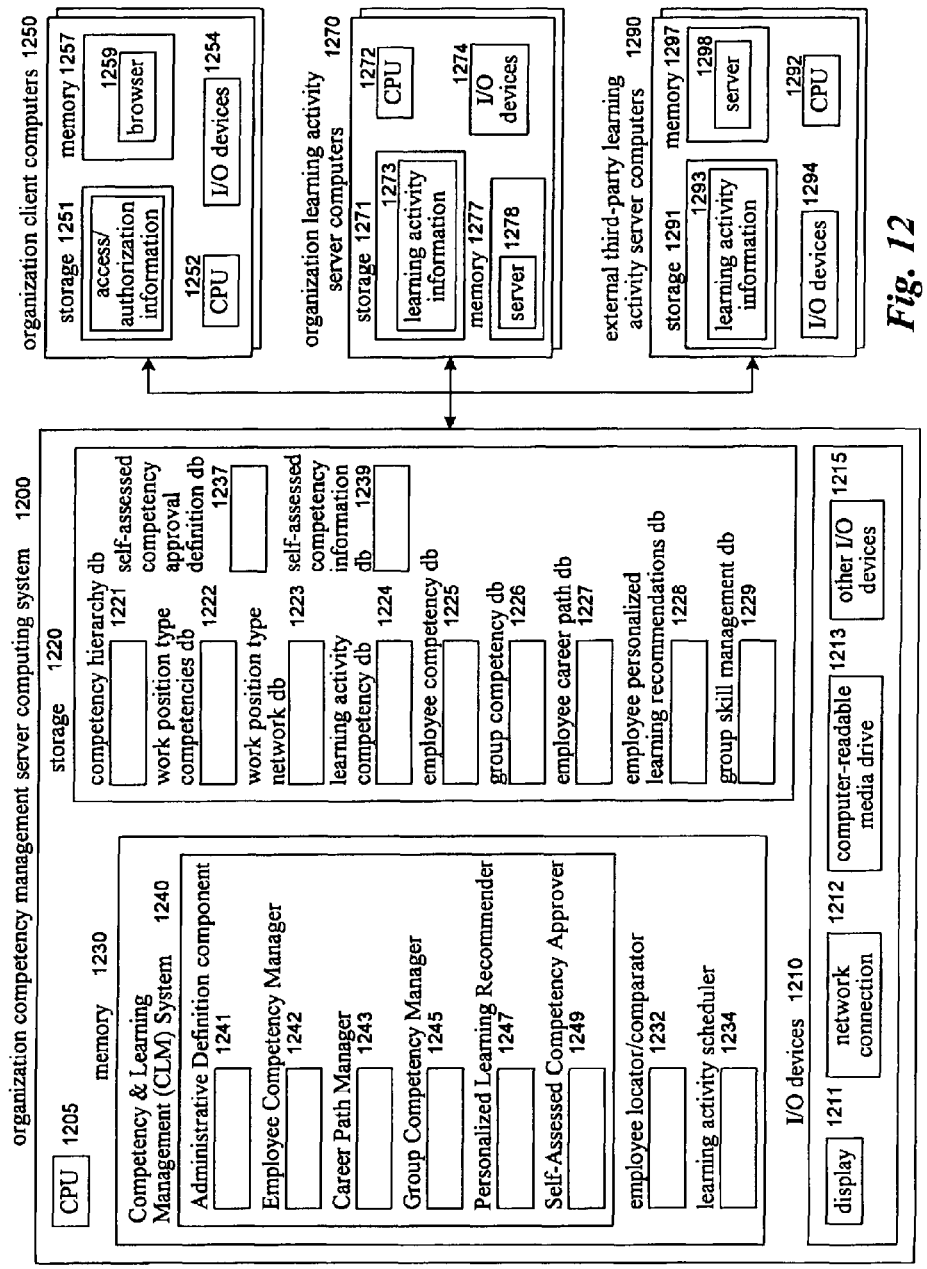
FIG. 12 is a block diagram illustrating an embodiment of a computing system suitable for providing the described techniques.

FIG. 12 illustrates a computing system suitable for executing an embodiment of a Competency and Learning Management (CLM) system facility capable of implementing the described techniques. In particular, an organization competency management server computing system 1200 is illustrated that provides various competency-related and learning-related functionality to users within an organization, and various organization client computers 1250 are illustrated from which such users can interact with the competency management server. In addition, various server computers are available in the illustrated embodiment to provide learning activity information (e.g., online courses or exams) to users of the client computers, including one or more organization learning activity server computers 1270 and one or more third-party external Web server computers 1290.

The competency management server includes a CPU 1205, various I/O devices 1210, storage 1220, and memory 1230. The I/O devices include a display 1211, a network connection 1212, a computer-readable media drive 1213, and various other I/O devices 1215. An embodiment of the CLM system 1240 is executing in memory, and it includes an Administrative Definition component 1241, an Employee Competency Manager component 1242, a Career Path Manager component 1243, a Group Competency Manager component 1245, a Personalized Learning Recommender component 1247, and a Self-Assessed Competency Approver component 1249. Various other software modules may also be executing in memory to provide functionalities to users, such as an employee locator/comparator component 1232 and a learning activity scheduler component 1234.

As discussed in greater detail below, the CLM system can provide various functionalities to users, and may be accessed by users in a variety of ways. For example, some users may have physical access to the competency management server, and if so may use the I/O devices 1210 to interact with the CLM system. Alternatively, other users may use the client computer systems 1250 to remotely access the CLM system (e.g., via the World Wide Web, such as over an intranet and/or the Internet). Such users may include employees accessing the system on their own behalf or to provide information for other employees, managers accessing the system on behalf of groups which they manage or with which they are otherwise associated, and/or administrators accessing the system for maintenance and configuration purposes.

One or more administrative users may initially access the CLM system to define various competency-related and learning-related information for the organization, such as by modifying default information supplied with the CLM system or by creating such information in an independent fashion. In particular, such administrative users access the Administrative Definition component in order to provide a variety of configuration information related to the organization. For example, in the illustrated embodiment administrative users define a hierarchy of competencies which is stored in a database 1221 on storage, and then associate appropriate competencies with work position types defined for the organization and with learning activities available to users in the organization. The resulting work position type competency information and learning activity competency information are stored in databases 1222 and 1224 on storage respectively. The administrator could also define and store a variety of rating systems (not shown) that each include multiple skill levels, and further associate a rating system together with a competency that is associated with a defined work position type and/or a defined learning activity. An administrative user can also define one or more work position type networks for the organization to show inter-relationships between different work position types, such as which work position types can lead to other work position types as well as associated restrictions on such transitions. The resulting work position type networks are stored in a database 1223 on storage. In addition, an administrator may define various approval groups and/or approval criteria for use with proposed self-assessed competencies, and associate that defined approval information with employees and/or competencies in various ways. Such defined approval information is stored in a database 1237 on storage.

In addition to the competency-related configuration information supplied by the administrators, various employee competency information and group competency information is also stored in databases 1225 and 1226 on storage respectively. In some embodiments, an administrator may define appropriate competency information for each new employee that joins the organization, and could similarly assign competency-related information to groups when they are created or modified. Alternatively, employees themselves could define their own competency information upon joining an information, and subsequently any changes to that competency information could be automatically tracked by the CLM system. Similarly, group competency information could be automatically generated based on aggregations of competency information for employees that are members of the group, with such information either calculated in advance of its use (e.g., on a periodic basis or after each change to an employee's competencies) and maintained on storage, or instead dynamically generated when needed. In the illustrated embodiment, the competency databases can each include information on a variety of types of competencies (e.g., current competencies, target competencies, planned competencies, proposed self-assessed competencies, etc.), while in other embodiments only some of those types of information may be stored and/or different types of competency information may be stored in different databases.

In the illustrated embodiment, employees may view and modify their own competency-related information. In particular, employees interact with the Employee Competency Manager component to specify various competency-related information, including modifications to their current competencies, target competencies (e.g., required competencies based on a work position or desired competencies based on personal interests), planned competencies (e.g., competencies which the employee plans to acquire), proposed self-assessed competencies (e.g., to submit proposed competencies and/or to view status information about the approval of submitted proposed competencies), competency gaps to be corrected, and/or skill level history information about past changes in skill levels. Employees that are using organization client computers may perform such interactions with the CLM system via a Web browser 1259 (e.g., by accessing an employee relationship management section of a Web portal for the organization) executing in memory 1257 of a client computer, while in other embodiments other types of software (e.g., software specific to the CLM system, such as proprietary software) could instead be used for CLM system interactions. In addition to memory 1257, the illustrated client computers each include a CPU 1252, various I/O devices 1254 and storage 1251. In some embodiments, the storage may contain various employee-specific information, such as access or authorization information needed to retrieve information from the CLM system, as well as calendar or schedule information (not shown) for an employee that may be used when scheduling future learning activities.

Employees can also access other CLM system functionality by interacting with other system components. For example, employees can perform career path management activities by interacting with the Career Path Manager component. These career path management activities of an employee may take a variety of forms, including the following: viewing information about their current work position type and about one or more other work position types of interest; viewing possible career paths (that may include one or more intermediate work position types) from their current or a specified starting work position type to a specified target work position type; specifying one or more target work position types as defined goals for use in determining one or more future action plans for execution by the employee to progress to those target work position types; and viewing and modifying an action plan so as to interactively manage their career. The employee can also specify a timeline for an action plan, and use that timeline in scheduling required or desirable learning activities or other actions to be performed by the employee to reach a work position goal. Career path management information for employees is stored in the employee career path information database 1227 on storage.

Employees can also interact with the Personalized Learning Recommender component to receive personalized learning recommendations based on competency gaps, such as competency gaps between their current competencies and the competencies that are required or preferred for their current work position type. Recommendations for learning activities can also be generated to reduce or eliminate competency gaps that result from target competencies independent of a current work position type (e.g., target competency gaps that are related to a future career path and/or are based on recommendations or requirements specified by a supervisor). The personalized learning recommendation information for employees is stored in a database 1228 on storage in the illustrated embodiment, but could instead be generated dynamically when needed in other embodiments.

Employees can also access the CLM system other than to use their own competency-related information, such as managers that wish to perform various planning or management activities with respect to employees or groups that they supervise or manage, or employees that wish to provide or view validation information for other employees' self-assessed competencies. For example, managers can use the Group Skill Manager component to view current competencies of one or more groups which they supervise (as well as competency-related information for individual employees within such groups), and can specify target competencies for their groups or employees. After specifying target group competencies, the Group Skill Manager component presents the manager with information about competency gaps between the current competencies of the group and the target competencies of the group, and allows the manager to specify actions to correct the competency gaps. For example, the manager can specify members of the group who are responsible for correcting competency gaps for the group and/or can attempt to identify new potential group members who possess current and/or planned competencies that would reduce or eliminate competency gaps for the group. When the group members to which target competencies or competency gaps are distributed by a manager are themselves groups, that manager or a manager for those other groups can similarly assign target competencies or competency gaps to be corrected to members of those groups in a recursive fashion. Group skill management information is stored for the group in database 1229 on storage in the illustrated embodiment, but could instead be stored individually for each group member in other embodiments.

The Self-Assessed Competency Approver component assists in providing information to employees about the self-assessed competencies of other employees (e.g., when the user is in the approval review group for those other employees) and to gathering validation information for those self-assessed competencies from employees. In some situations, the providing of information about the self-assessed competencies of other employees is performed in an automated manner, such as when the component determines the appropriate validation reviewers for a submitted proposed self-assessed competency and notifies those reviewers. After receiving validation information from one or more reviewers, the Self-Assessed Competency Approver component can then determine whether to approve a proposed self-assessed competency, such as based on an explicit approval assessments from one or more authorized reviewers and/or by applying an appropriate approval criteria to validation assessments from one or more reviewers. The validation information from the reviewers (and the component if it performs automated validation) is stored in database 1239 on storage in the illustrated embodiment, but could instead be stored in other manners (e.g., individually for each reviewer and/or for each employee proposing a self-assessed competency). After proposed self-assessed competencies are approved, information in the employee competency database is automatically updated, either directly by the Self-Assessed Competency Approver component or by interactions of that component with other components. In addition, information in other databases (e.g., the group competency database) can similarly be automatically updated as appropriate.

Employees can also use other modules that interact with the CLM system in order to receive other functionalities. For example, users can interact with the employee locator/comparator component to identify employees having specified competencies, competency gaps, skill levels and/or skill level histories, and can compare two or more employee with respect to any such competency-related information. In addition, employees can interact with the learning activity scheduler component to identify, schedule and participate in available learning activities. The learning activity scheduler component can obtain information about available learning activities from the learning activity server computers 1270 and 1290, which in the illustrated embodiment store learning activity information 1273 and 1293 respectively on their storages 1271 and 1291. The illustrated learning activity servers also each include an executing server 1278 or 1298 in memory to provide learning activity information to the learning activity scheduler component and/or to the client computers, and each include a CPU 1272 or 1292 and various I/O devices 1274 or 1294.

Those skilled in the art will appreciate that the computing devices and computer systems 1200, 1250, 1270 and 1290 are merely illustrative and are not intended to limit the scope of the present invention. In particular, a "client" or "server" may comprise any combination of hardware and/or software that can interact and perform some or all of the described functionality, including computers, network devices, internet appliances, PDAs, wireless phones, pagers, electronic organizers, television-based systems and various other consumer products that include inter-communication capabilities. The devices and systems may also be connected to other devices that are not illustrated, including through one or more networks such as the Internet or via the World Wide Web. In addition, the functionality provided by the illustrated system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 13:
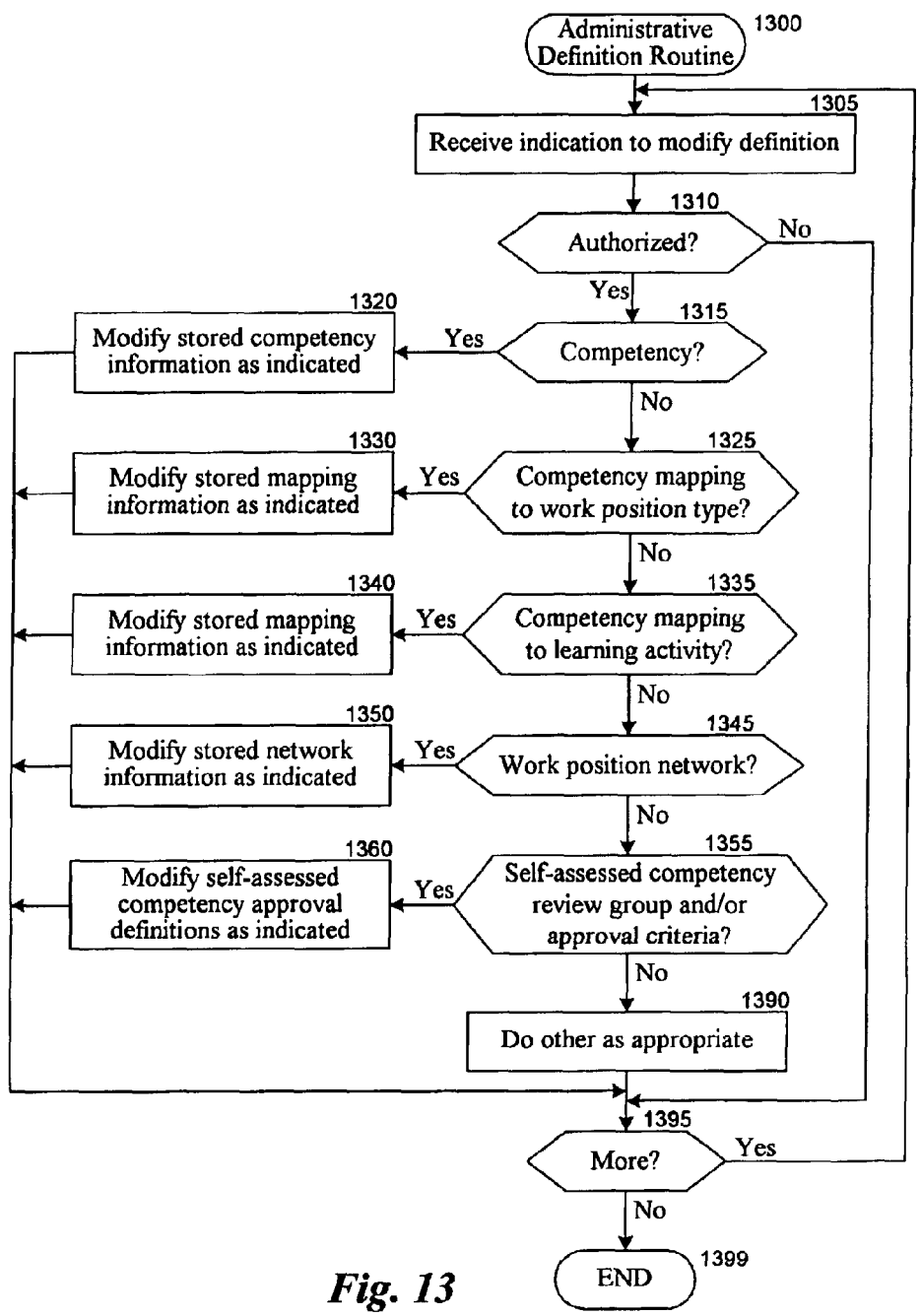
FIG. 13 is a flow diagram of an embodiment of the Administrative Definition routine.

FIG. 13 is a flow diagram of an embodiment of the Administrative Definition routine 1300. The routine allows administrators to specify various competency-related configuration information to be used by other CLM system components.

The routine begins at step 1305 where an indication is received from the administrator to specify or modify a competency-related definition or to specify or modify a definition for a work position type network. The routine continues to step 1310 to determine if the user is authorized to make the specified change (e.g., based on access or authorization information provided by the user), and if not continues to step 1395. If the user is authorized, the routine continues to step 1315 to determine whether the user has specified competency information (e.g., a change to a competency hierarchy for the organization), and if so, the routine continues to step 1320 to modify the competency information as indicated.

If it was instead determined in step 1315 that the initially received indication was not to modify competency information, the routine continues to step 1325 to determine whether the indication was related to the mapping of competency (and optionally skill rating systems) to defined work position types. If so, the routine continues to step 1330 to modify the mappings as indicated. If it was instead determined in step 1325 that the initially received indication was not related to the mappings of competencies to work position types, the routine continues to step 1335 to determine whether the initially received indication was related to the mappings of competencies (and optionally rating systems) to define learning activities. If so, the routine continues to step 1340 to modify the mappings between competencies and learning activities as indicated.

If it was instead determined in step 1335 that the received indication was not related to mappings between competencies and learning activities, the routine continues to step 1345 to determine if the initially received indication was related to the definition of a work position type network. If so, the routine continues to step 1350 to modify the stored work position network definitions as indicated. If it was instead determined in step 1345 that the initially received indication was not related to work position type network definitions, the routine continues to step 1355 to determine if the initially received indication was related to the definition of an approval group and/or an approval criteria for proposed self-assessed competencies. If so, the routine continues to step 1360 to modify the stored definitions for the approval groups and/or approval criteria as indicated. If it was instead determined in step 1355 that the initially received indication was not related to approval definitions, the routine continues to step 1390 to perform another indicated action if appropriate (e.g., defining a skill rating system with multiple skill levels). After steps 1320, 1330, 1340, 1350, 1360, or 1390, the routine continues to step 1395 to determine whether to continue. If so, the routine returns to step 1305, and if not the routine continues to step 1399 and ends.

Figure 14:
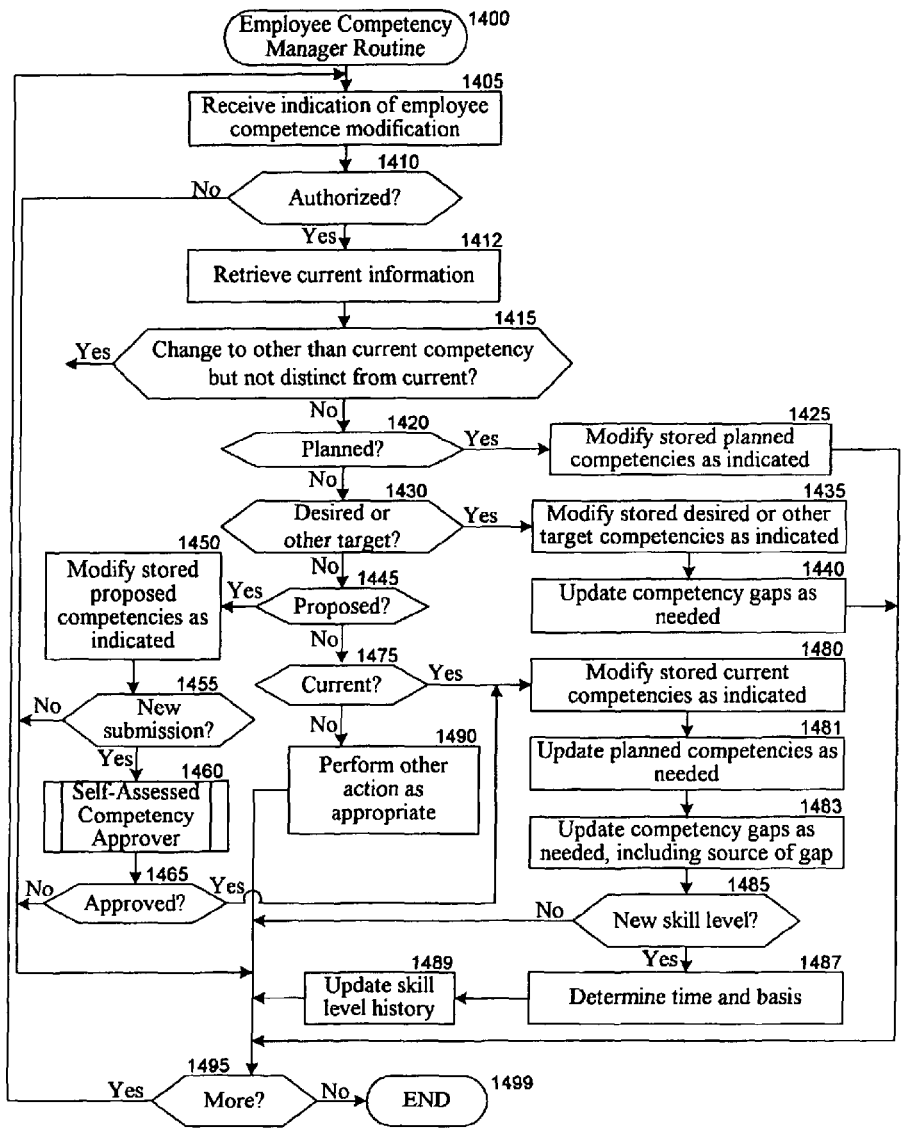
FIG. 14 is a flow diagram of an embodiment of the Employee Competency Manager routine.

FIG. 14 is a flow diagram of an embodiment of the Employee Competency Manager routine 1400. The routine receives indications of modifications to competency-related information for employees, and updates the competency information as appropriate.

The route begins at step 1405 where an indication is received of a modification to competency-related information for an employee. The routine then continues to step 1410 to determine whether the user from which the indication is received is authorized to make the modification, and if not continues to step 1495. If the user is authorized, the routine continues to step 1412 to retrieve various competency-related information for the indicated employee. In step 1415, the routine then determines if the indication is related to a modification for something other than a current competency of the employee, and if so whether an existing current competency of the employee negates the need for the modification. For example, if a user already has a specified skill level of a specified skill, the illustrated embodiment does not allow a target competency to be set for that current skill level of that skill or a lower skill level. Thus, if it is determined in step 1415 that this condition exists, the routine continues to step 1495. If not, the routine continues to step 1420 to determine whether the indication is related to a modification of a planned competency for the employee. If so, the routine continues to step 1425 to modify the stored planned competencies for the employee as indicated if appropriate (e.g., if the planned competency modification would merely produce redundant information, the modification would not be made).

If it is instead determined in step 1420 that the indicated modification is not related to a planned competency, the routine continues to step 1430 to determine if the indication is related to a desired or other target competency. If so, the routine continues to step 1435 to modify the stored target competencies for the employee as indicated if appropriate. The routine then continues to step 1440 to update competency gaps for the employee if appropriate, such as to treat a newly specified desired competency as a competency gap. If other information is to be associated with competency-related information being modified, such as a criticality or other related value to the employee or organization, such information can be supplied in various ways. In some embodiments, such information will be supplied with the initially received indication in step 1405. In other embodiments, the user may be prompted for such information if it is missing, or in other embodiments such information may be determined automatically (e.g., based on defaults or intelligent processing) or left blank if not specified.

If it was instead determined in step 1430 that the indicated modification was not to a target competency, the routine continues to step 1445 to determine if the modification was with respect to a proposed self-assessed competency of the user. If so, the routine continues to step 1450 to modify the stored proposed self-assessed competencies of the user as indicated if appropriate. The routine then continues to step 1455 to determine if the modification results in a new submission of a proposed self-assessed competency for approval. If so, the routine continues to step 1460 to execute the Self-Assessed Competency Approver subroutine for that new proposed competency. After step 1460, if it is next determined in step 1465 that the proposed self-assessed competency was approved, the routine continues to step 1480. While the routine in the illustrated embodiment waits to receive an approval indication from step 1460 before continuing, those skilled in the art will appreciate that in other embodiments the routine may continue in an asynchronous manner and process an approved or denied self-assessed competency at a later time.

If it was instead determined in step 1445 that the indicated modification was not to a proposed self-assessed competency, the routine continues to step 1475 to determine if the modification was with respect to a current competency of the user. If so, the routine continues to step 1480 to modify the stored current competencies of the user as indicated if appropriate. The routine then continues to step 1481 to update the planned competencies of the employee as appropriate (e.g., if the achievement of the current competency represents an achievement of a planned competency). The routine then continues to step 1483 to update the current competency gaps for the employee as appropriate (e.g., if the achievement of the current competency eliminates one or more existing competency gaps), including updating the source of any such competency gaps as appropriate. For example, if a competency gap that is being removed resulted from a target competency, that target competency will also be removed for the employee as it has now been satisfied.

The routine then continues to step 1485 to determine whether the modification of the current competency was for a skill having multiple associated skill levels. If so, the routine continues to step 1487 to determine a time of the achievement of the new skill level as well as a basis for achieving that new skill level, and then continues to step 1498 to update a skill level history for the employee to reflect the new skill level along with the determined time and basis. As with other competency-related information, time and basis information can be determined in a variety of ways, such as based on information supplied in step 1405, information available from other CLM system components or related components (e.g., information about completion of an online course or exam from a learning activity scheduler component), etc. If it was instead determined in step 1475 that the indicated modification was not related to a current competency, the routine continues to step 1490 to perform another competency-related modification if appropriate. After steps 1425, 1440, 1489 or 1490, or if it was determined in step 1480 that a new skill level was not achieved by the employee or in steps 1455 or 1465 that a proposed self-assessed competency was not a new submission or was not approved, the routine continues to step 1495 to determine whether to continue. If so, the routine returns to step 1405, and if not the routine continues to step 1499 and ends.

Figure 15:
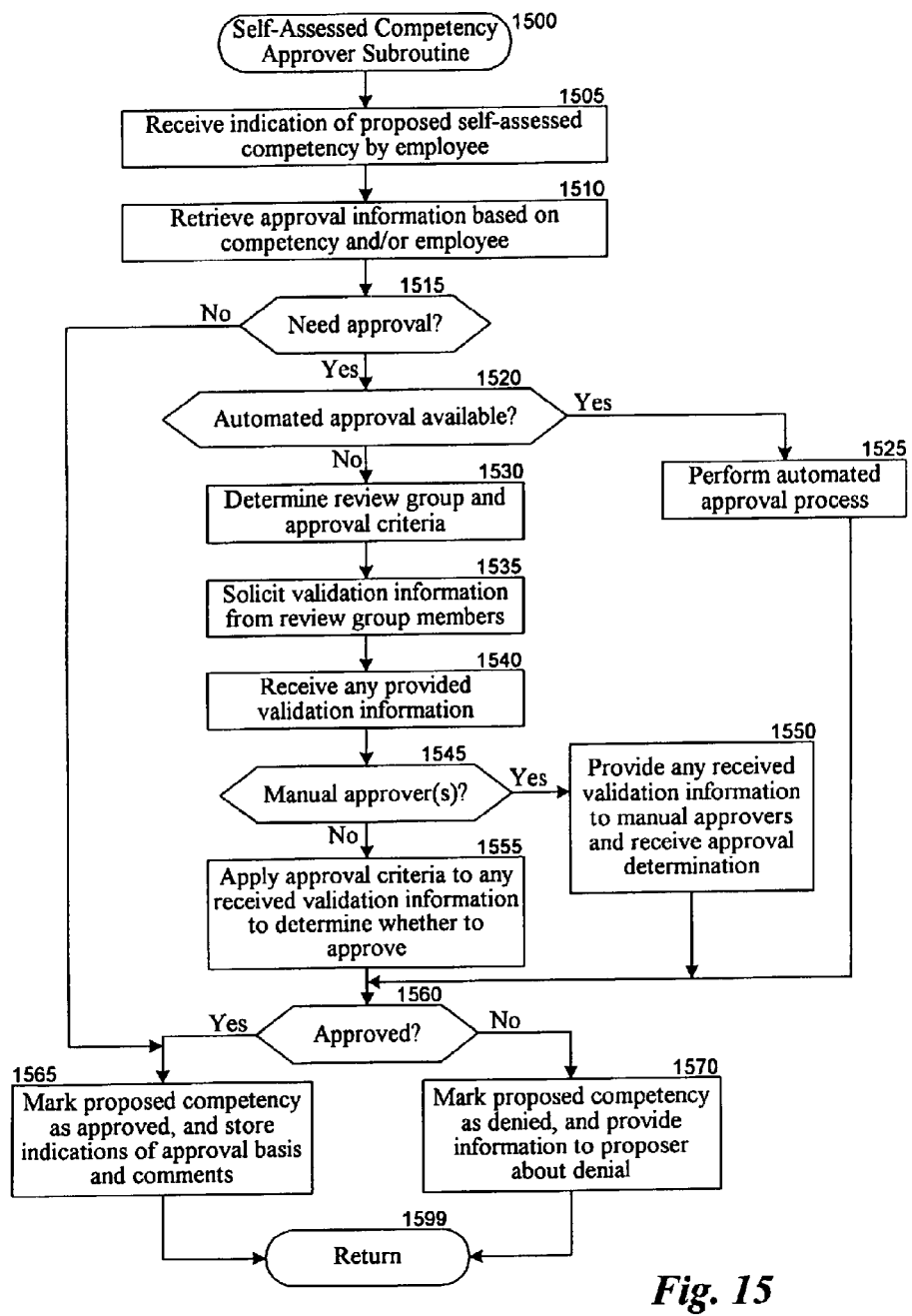
FIG. 15 is a flow diagram of an embodiment of the Self-Assessed Competency Approver subroutine.

FIG. 15 is a flow diagram of an embodiment of the Self-Assessed Competency Approver subroutine 1500. The subroutine receives indications of newly submitted proposed self-assessed competencies, determines an appropriate approval process, and performs the approval process in an automated manner.

The subroutine begins at step 1505 where an indication is received of a new self-assessed competency proposed by an employee. The subroutine continues to step 1510 to retrieve approval definition information that is appropriate for the proposed competency, such as based on the employee and/or on the competency. The subroutine then continues to step 1515 to determine if independent approval is needed, and if so continues to step 1520 to determine whether the approval process can be performed in a wholly automated manner without soliciting and receiving validation information from one or more reviewers. If so, the subroutine continues to step 1525 to perform the wholly automated approval process (e.g., based on an online computer-based verification of the employee's competency).

If it was instead determined in step 1520 that a wholly automated approval process is not available, the subroutine continues to step 1530 to determine an appropriate approval group and approval criteria based on the retrieved approval definition information. The subroutine then continues to step 1535 to solicit validation information from the one or more validation reviewer members of the approval group as appropriate, and in step 1540 receives any provided validation information from some or all of the solicited group members. In some embodiments, it may also be possible for other reviewers that are not part of the approval group to identify proposed self-assessed competencies that are in the approval process and to provide validation information to be used as part of the approval process. While the subroutine in the illustrated embodiment waits to receive validation information before proceeding (e.g., for a specified time and/or until a sufficient number of validation assessments have been received to enable an automated determination of approval/denial), those skilled in the art will appreciate that in other embodiments the subroutine may continue in an asynchronous manner to process other self-assessed competencies and then process validation information for the current self-assessed competency at a later time.

After step 1540, the subroutine continues to step 1545 to determine whether one or more reviewers are designated to provide explicit approval assessments (e.g., by the approval criteria), such as any of them individually, and if so continues to step 1550 to provide any received validation information from other reviewers to those designated reviewers and to receive an approval or denial indication from one or more of the designated reviewers. If an aggregation of the explicit approval assessments is needed in order to determine an ultimate approval/denial of the proposed competency, this is also performed in step 1550. However, if it was instead determined in step 1545 that no such explicit approval assessment reviewers were designated, the subroutine continues to step 1555 where the approval criteria is applied to any received validation information and a determination is made in an automated manner of whether to approve or deny the proposed self-assessed competency. After steps 1525, 1550 or 1555, the subroutine continues to step 1560 to determine whether the proposed self-assessed competency has been approved.

If it is determined in step 1560 that the proposed self-assessed competency has been approved, or in step 1515 that the proposed self-assessed competency does not need independent approval, the subroutine continues to step 1565 to approve the proposed competency (e.g., by updating the employee competency database) and to store information about the approval (e.g., information about the validation information received from the various validation reviewers and the results of applying the approval criteria). If it was instead determined in step 1560 that the proposed self-assessed competency has not been approved, however, the subroutine continues to step 1570 to deny the proposed competency (e.g., by updating the employee competency database) and to provide information to the employee that proposed the competency about the denial (e.g., by updating the information to be presented to the employee in section 570 of the UI screen illustrated with respect to FIGS. 5A-5C). In the illustrated embodiment, the subroutine does not store explicit information about the denial (e.g., the validation information from the validation reviewers), but in other embodiments indications of the occurrence of the denial and/or of the details about the denial may be stored (e.g., as part of the skill level change history for the proposed competency). After steps 1565 or 1570 the subroutine continues to step 1599 and returns, and in the illustrated embodiment provides an indication of the approval or denial of the proposed competency.

Figure 16:
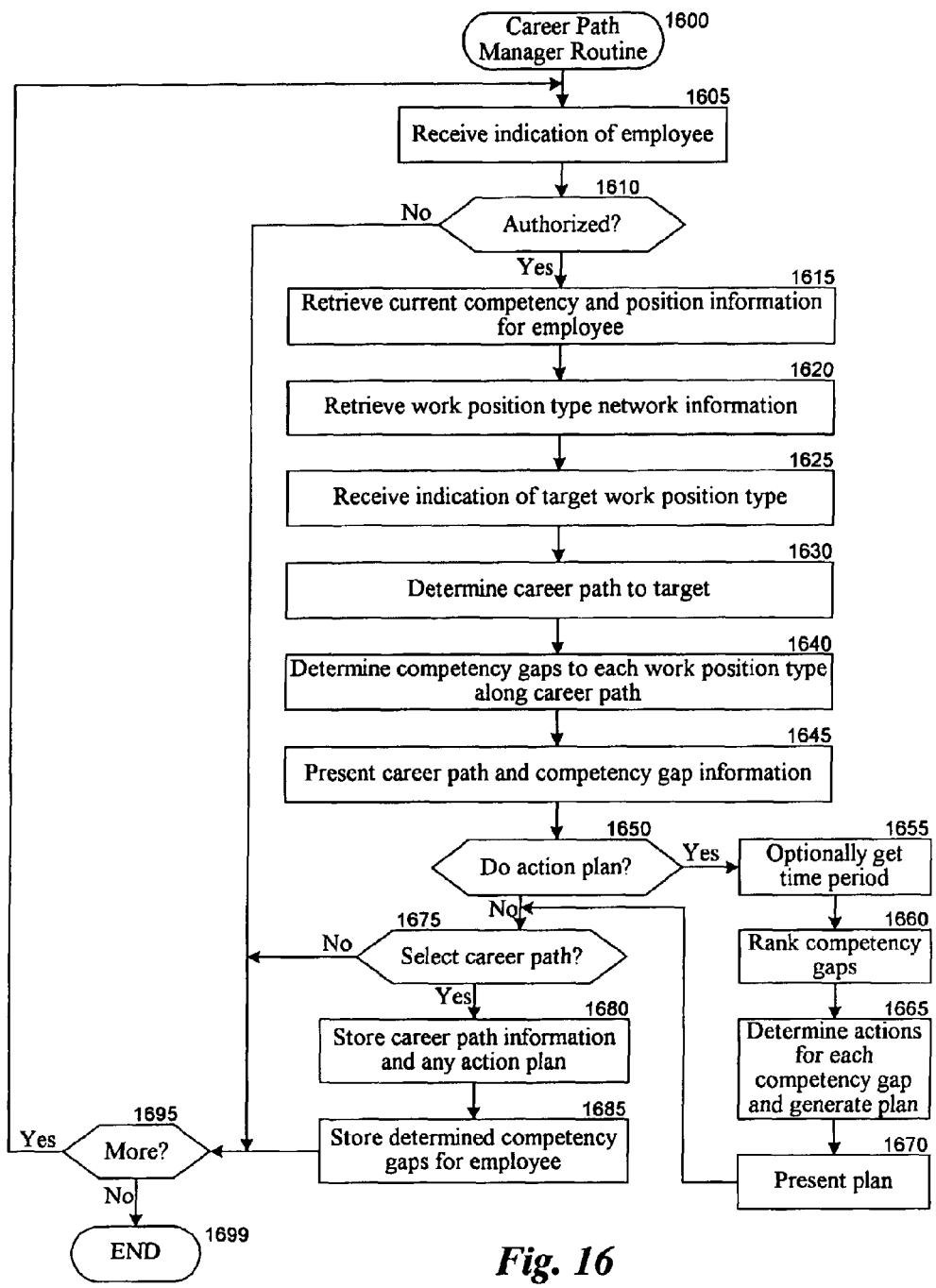
FIG. 16 is a flow diagram of an embodiment of the Career Path Manager routine.

FIG. 16 is a flow diagram of an embodiment of the Career Path Manager routine 1600. The routine allows employees or their managers to view and specify career path management information, including identifying future work position types as a goal for the employee.

The routine begins at step 1605 where an indication is received of an employee, and in step 1610 the routine determines whether the user is authorized to view and specify career path management information for the employee. If so, the routine continues to step 1615 where current competency-related information and current work position type information for the employee is retrieved. The routine then continues to step 1620 where previously defined work position type network definition information for the organization is retrieved. In step 1625, the routine then receives an indication from the user of a target work position type for the employee.

In the illustrated embodiment, the current work position type of the employee will be used as a starting point for purposes of determining possible career paths to the indicated target work position type, but in other embodiments the user may be allowed to specify both one or more starting work position types that are independent from a current work position type. In addition, only one target work position type may be specified at a time in the illustrated embodiment, although in other embodiments multiple target work position types may be specified. Alternatively, in some embodiments the target work position type used for the career path management could be restricted to a work position type that immediately follows the starting work position type in the work position type network definition for the organization, and thus could be selected by default without an indication from the user if only one such target work position type was available for the current work position of the employee. In addition, the illustrated embodiment shows only the specification of a new career path based on an indicated target work position type, but those skilled in the art will appreciate that in other embodiments stored career path information could be retrieved and manipulated without requiring the specification of the target work position type again.

After step 1625, the routine continues to step 1630 to determine a career path from the start work position type to the target work position type. If multiple career paths are available, in the illustrated embodiment the routine automatically chooses one to be used (e.g., based on criteria such as shortest length or most common), but in other embodiments all of the possible career paths could be presented to the user, such as to allow the user to select one or more of those career paths for use. After retrieving the competency-related information for each work position type along the determined career path, the routine in step 1640 next determines competency gaps between each two adjoining work position types along the career path and in light of the employee's current competencies. In step 1645, the routine then presents to the user the career path information and corresponding competency gap information for the work position types along the career path, and may also present current competency information for the employee. If any additional non-competency restrictions are defined between any two work position types along the career path, they will also be presented.

The routine then continues to step 1650 to determine whether the user wishes to create an action plan for the employee related to the career path. If so, the routine continues to step 1655 where it optionally receives an indication of a time period by the end of which the determined competency gaps (or a selected subset of them) are to be eliminated by the action plan. In step 1660, the routine then ranks the determined competency gaps in order of importance for the employee to eliminate them, such as by ranking those competency gaps that prevent the employee from reaching the next work position type along the career path as the highest or instead ranking competency gaps most highly if their elimination would most improve the employee's relative value within the organization. In step 1665, the routine then determines one or more actions for each competency gap, such as identifying learning activities that when completed would reduce or eliminate those competency gaps, and generates a corresponding plan. If any additional restrictions were specified along the career path, one or more actions will also be determined for each such restriction and included in the plan. The plan is then presented to the user in step 1670. While not part of the illustrated embodiment, the user may in other embodiments be allowed to interactively modify the action plan in various ways, such as to select one of multiple action options for a competency gap that is to be performed, reordering action options and/or re-ranking competency gaps, adding or removing action options and/or competency gaps, etc.

After step 1670, or if it was instead determined in step 1650 that an action plan was not to be generated, the routine continues to step 1675 to determine whether to select the determined career path as a defined goal for the employee. In other embodiments, additional functionality could also be provided, such as the following: identifying available work positions for the employee for consideration (e.g., for future work position types along the career path if the employee is expected to be qualified for those work positions by the time that the work positions are to be filled); providing various details about one or more work position types along the career path (e.g., a job description, a salary range, a comparison to actual or example employees that are currently in that work position type, etc.); identifying additional work position types that are not along the determined career path but in which the employee may have an interest (e.g., based on current or planned competencies of the employee qualifying them for those work positions); etc.

If it is determined in step 1675 to select the determined career path for the employee, the routine continues to step 1680 to store the career path information for the employee, including any action plans generated by the routine. The routine then continues to step 1685 to identify competency gaps to be added to the employee's competency gap information based on the career path and/or action plan (e.g., the competency gaps for the next work position type along the career path, a subset of the highest-ranking competency gaps, or all of the competency gaps), and stores those identified competency gaps for the employee (e.g., by executing the Employee Competency Manager routine and supplying an indication of the employee and the competency gaps). In embodiments in which information about the source of a competency gap is stored and used, source information can also be included to indicate that the stored career path and/or its corresponding action plan are the source for those competency gaps, either alone or in combination with a manager recommendation. After step 1685, or if it was instead determined in step 1610 that the user was not authorized or in step 1675 that the career path was not selected, the routine continues to step 1695 to determine whether to continue. If so, the routine returns to step 1605, and if not the routine continues to step 1699 and ends.

Figure 17:
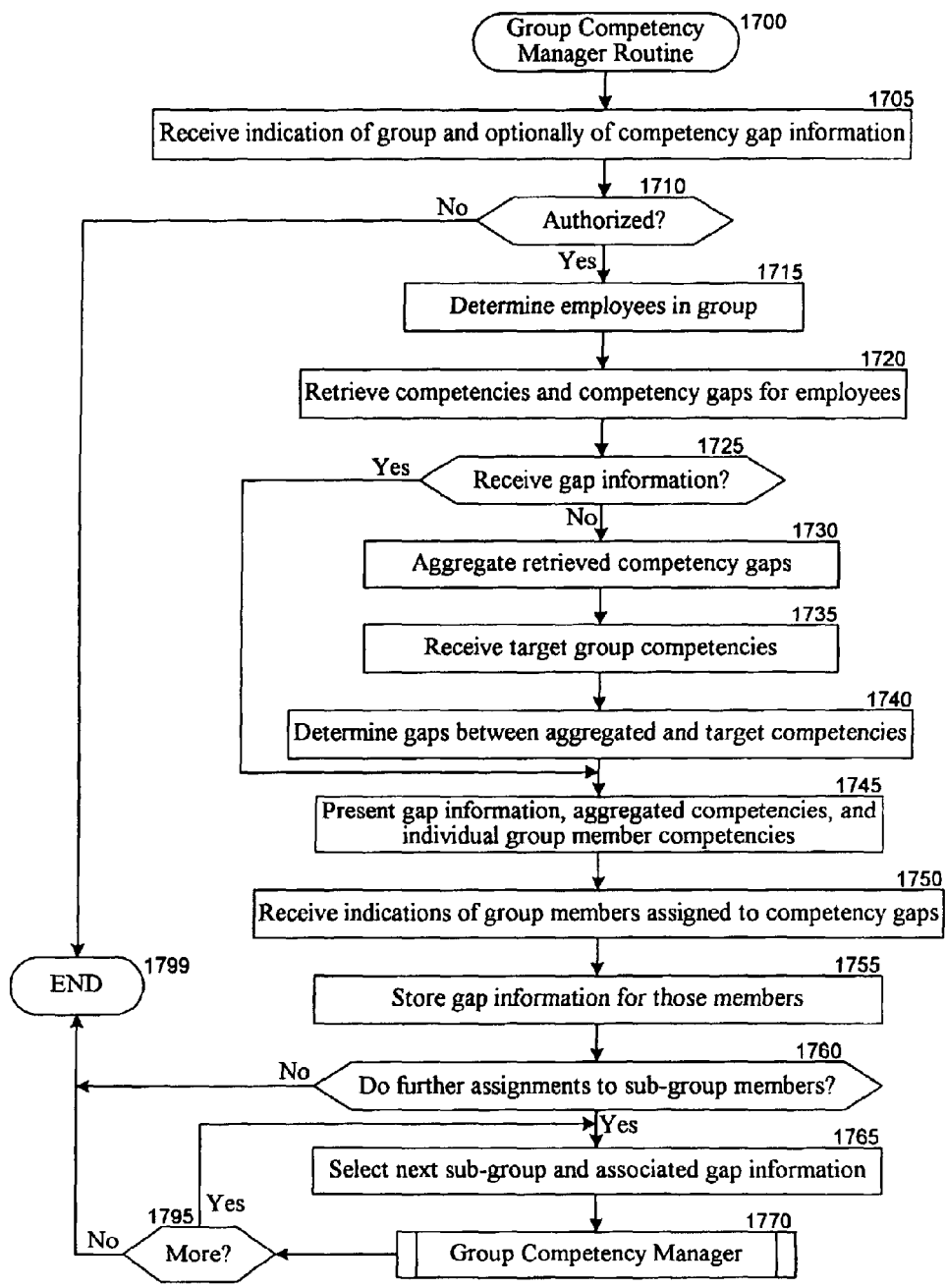
FIG. 17 is a flow diagram of an embodiment of the Group Skill Manager routine.

FIG. 17 is a flow diagram of an embodiment of the Group Competency Manager routine 1700. The routine allows a manager of a group to review current competencies of a group and to specify target competencies for that group, and to then optionally determine an action plan for how resulting competency gaps are to be resolved.

The routine begins in step 1705 where an indication is received of a group, and competency gap information is optionally received. The routine then continues to step 1710 to determine whether the user performing the routine is authorized to review and modify such group competency information, and if not the routine continues to step 1799 and ends. In other embodiments, the routine could instead determine whether to continue executing, such as by returning to step 1705 and receiving new group indications.

In the illustrated embodiment, if it is determined in step 1710 that the user is authorized, the routine continues to step 1715 to determine the employees that are members of the group, such as by retrieving stored information if available or instead performing a dynamic determination if stored information is not available. When members of the group are themselves sub-groups having multiple members, in the illustrated embodiment employee information for the sub-groups will be retrieved and provided so that all employees in the hierarchical organization below the indicated group will be determined. The routine then continues to step 1720 to retrieve the competency-related information for the determined employees. In step 1725, the routine then determines if competency gap information was supplied in step 1705, and if so the routine continues to step 1745. Otherwise, the routine instead continues to step 1730 to aggregate the retrieved competency information for the determined group employees, to receive target competency-related information for the group in step 1735, and to determine competency gaps between the current and target group competency-related information in step 1740.

After step 1740, the routine in step 1745 presents to the user the competency gap information for the group and the group member employees. In step 1750, the routine then optionally receives from the user one or more indications each specifying one or more of the group members to whom a competency gap is to be assigned (whether in full or in part), thus making it the responsibility of that group member to correct the competency gap that is assigned to them. If any of the group members are sub-groups, competency gaps can similarly be assigned to the sub-group, with the current user or a manager for that sub-group then able to further assign those competency gaps to members of that sub-group. That practice can continue on in a recursive downward manner. While not illustrated here, the user can also in some embodiments attempt to identify potential new group members that have current or planned competencies that would reduce or eliminate the competency gaps of the group, such as by using an employee locator service to identify relevant current employees and/or by generating a new job requisition job for a work position type that includes the appropriate competencies.

After step 1750, the routine continues to step 1755 to store the assigned competency gaps for any group members which received them (e.g., by executing the Employee Competency Manager routine). The routine then continues to step 1760 to determine whether any members of the group which received assigned competency gaps are themselves sub-groups, and if so whether the user wishes to further assign those competency gaps to members of those sub-groups. If so, the routine continues to step 1765 to select a next such sub-group, beginning with the first, and then continues to step 1770 to execute the Group Competency Manager routine (e.g., in a recursive manner) for that sub-group and for that assigned competency gap. In step 1795, the routine then determines whether there are more such sub-groups, and if so returns to step 1765. If it is instead determined in step 1795 that there are not more such sub-groups, or in step 1760 that there are not group members that are sub-groups with assigned competency gaps for which the user wishes to perform additional processing, or in step 1710 that the user is not authorized, the routine continues to step 1799 and ends.

Figure 18:
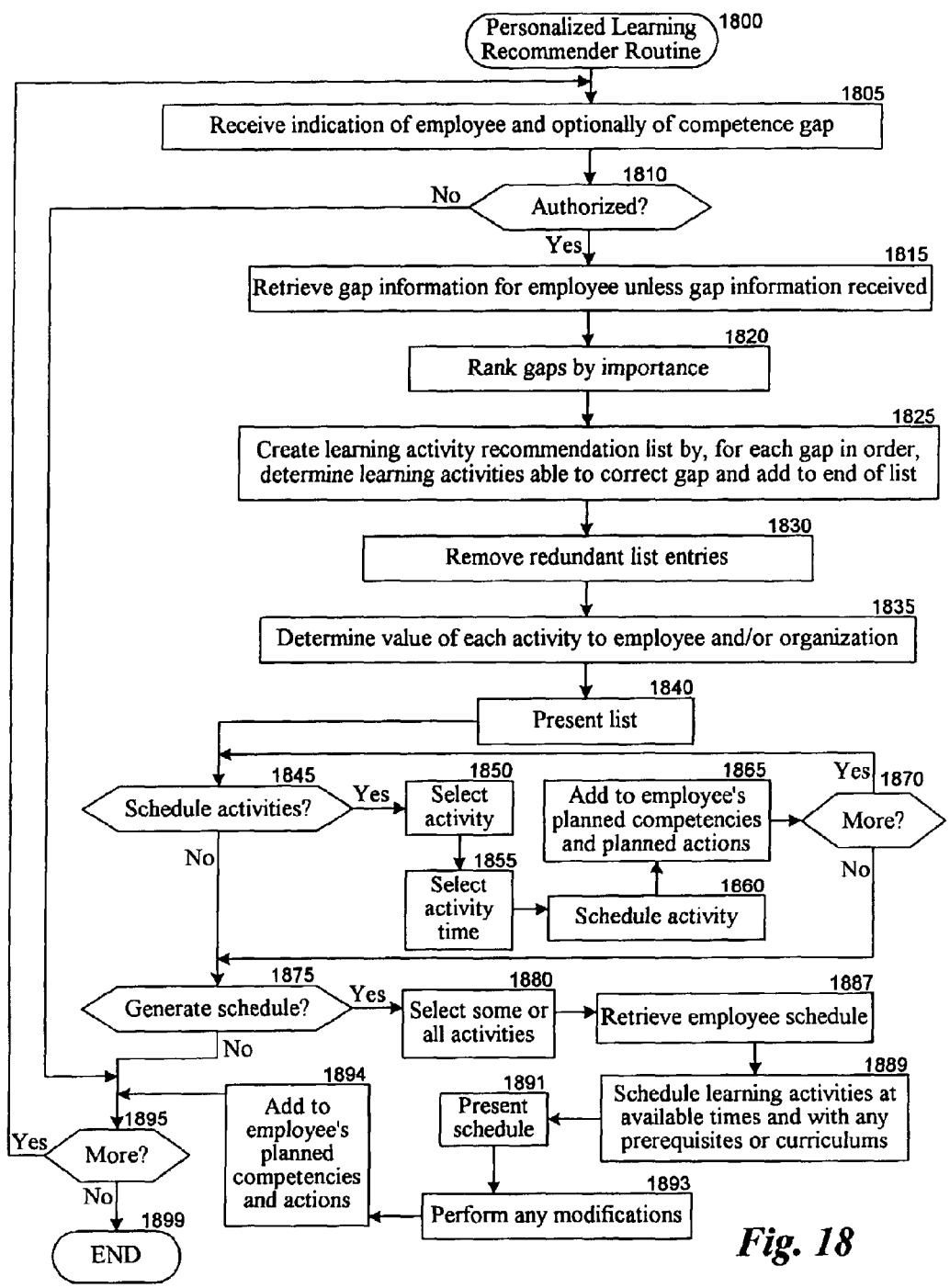
FIG. 18 is a flow diagram of an embodiment of the Personalized Learning Recommender routine.

FIG. 18 is a flow diagram of an embodiment of the Personalized Learning Recommender routine 1800. The routine determines personalized recommendations of learning activities for an employee based on competency gaps associated with that employee, and presents that information for use by the employee.

The routine begins in step 1805 where an indication is received of an employee, and where competency gap information for the employee is optionally received. In step 1810, it is determined if the user is authorized to perform the routine, and if so the routine continues to step 1815 to retrieves competency gap information for the employee if it was not supplied in step 1805. After step 1815, the routine continues to step 1820 to rank the competency gaps in their order of importance. As previously discussed, such competency gap ranking can be performed in a variety of ways, such as based on assigned criticality of competency gaps (e.g., as assigned by the source of the competency gap, such as when the competency gap is from a definition for a work position type and the competency gap is for a required competency having that criticality value), a size of the competency gap, etc.

In step 1825, the routine creates a list of learning activity recommendations by determining learning activities able to correct the ranked gaps, such as learning activities that have corresponding associated resulting competencies. Information about learning activities can be retrieved from various sources, such as an internal and/or external server or by interacting with an appropriate component such as a learning activity scheduler component. In step 1830, any duplicate learning activity entries on the recommendation list are removed by retaining the first of each such learning activity on the list. If a learning activity was present on the list to correct two or more different competency gaps, the remaining learning activity entry is modified to reflect each competency gap that will be corrected. In step 1835, the value of each remaining learning activity is then determined (e.g., to the employee and/or to the organization), such as based on the importance of the corresponding competency gaps and/or by using an independent valuation system.

The routine then continues to step 1840 to present the list of learning activity recommendations with associated values to the user. If it is determined in step 1845 that the user would like to schedule one or more of the learning activities, the routine continues to step 1850 to select a particular learning activity. In step 1855, a particular instance of the learning activity is selected (if there is more than one) based on the activity time, and in step 1869 the activity is scheduled. In step 1865, the information for the scheduled activity is then added to planned actions of the employee, and expected resulting competencies from the learning activity are added to the planned competency information for the employee (e.g., by executing the Employee Competency Manager routine). If it is determined in step 1870 that there are more activities to be selected, the routine returns to step 1845. If not, or if it was instead initially determined in step 1845 that no activities were to be scheduled, the routine continues to step 1875 to determine whether to generate a schedule for some or all of the learning activities.

If so, the routine continues to step 1880 to select some or all of the learning activities (e.g., based on a received indication from the user), and in step 1887 retrieves schedule information for the employee. In step 1889, a schedule for the selected learning activities is then generated based on available times in the employee's schedule, taking into consideration any prerequisites or related courses from a curriculum that are also to be scheduled. In some embodiments, the user and/or employee may optionally be able to specify a time period over which the scheduled learning activities are to occur. The generated schedule is then presented to the user in step 1891, and in step 1893 the user can optionally make one or more modifications to the generated schedule. In step 1894, any remaining scheduled learning activities are then added to the planned actions for the employee, and the planned competencies of the employee are also updated to reflect those activities. After step 1894, or if it was instead determined in step 1875 not to generate a schedule or in step 1810 that the user was not authorized, the routine continues to step 1895 to determine whether to continue. If so, the routine returns to step 1805, and if not the routine continues to step 1899 and ends.

Figure 19:
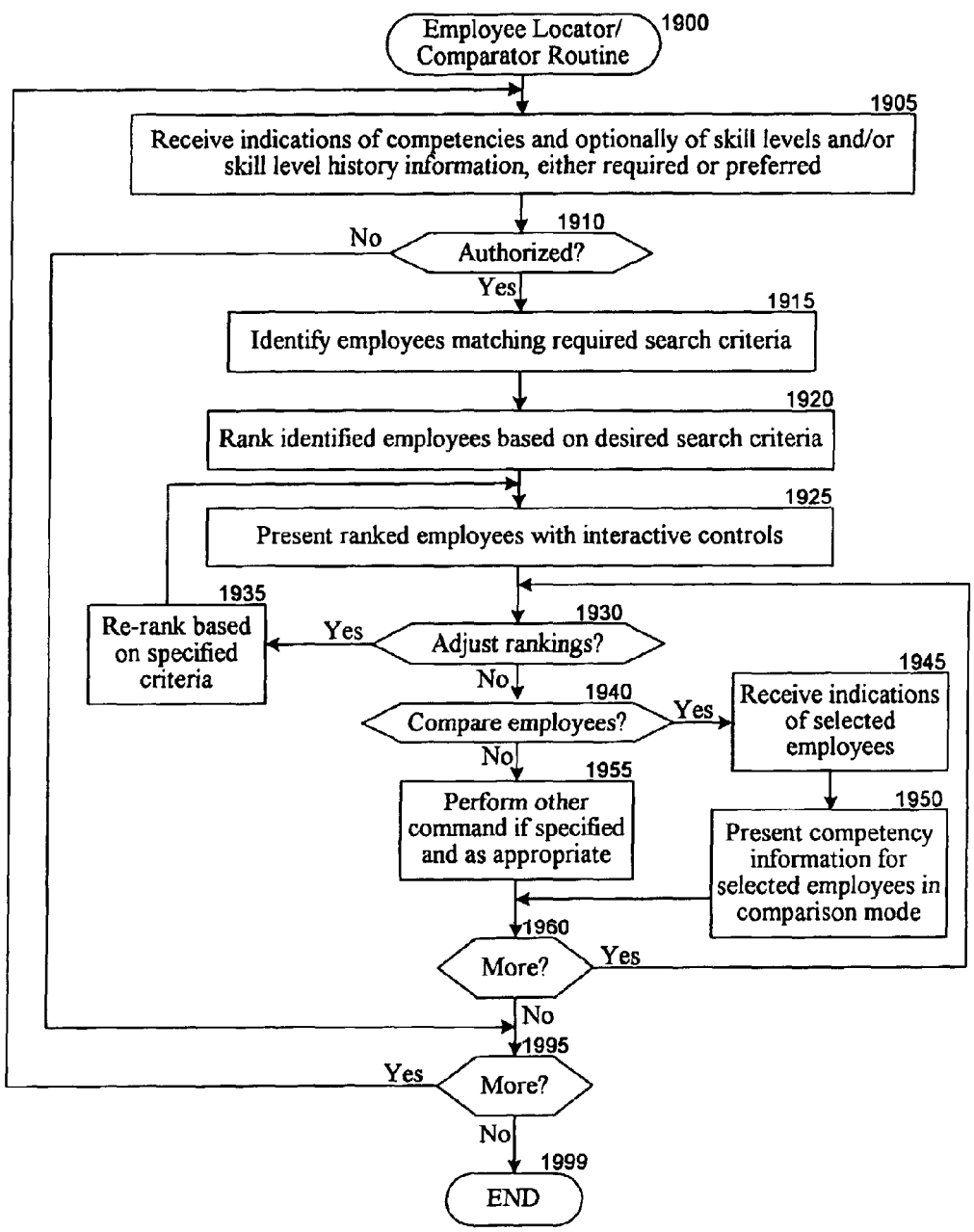
FIG. 19 is a flow diagram of the Employee Locator/Comparator routine.

FIG. 19 is a flow diagram of the Employee Locator/Comparator routine 1900. The routine receives indications of competency-related search criteria, identifies matching employees, and optionally provides comparison information about those employees.

The routine begins in step 1905 where an indication is received of at least one competency, and where skill level information and/or skill level history information are optionally received for any indicated skill-based competencies. In the illustrated embodiment, the user can optionally specify whether any of the specified search criteria are required or merely preferred when determining employees that match the search criteria. The skill level history information that can be used for searching can vary in different embodiments, and can include information such as dates in which any or specified skill levels were achieved, achievement bases for any or a specified skill level, numbers of previous skill levels for a specified skill, etc. After step 1905, the routine continues to step 1910 to determine whether the user is authorized to perform the indicated search. If so, the routine continues to step 1915 to perform a search to identify employees having any competencies, skill levels, and skill level history information that was indicated to be required. If any competency, skill level and/or skill level history information was indicated as being preferred, then in step 1920 any identified employees are ranked on the basis of that preference information. In other embodiments, additional or substitute criteria could instead be used for ranking of employees, such as by using a predefined hierarchy of preferred skill level history achievement bases (e.g., organization courses being more preferred than third-party courses which themselves are more preferred than self-assessments), by ranking employees with higher skill levels of a required skill higher than other employees having lower skill levels (assuming skill level information was not specified as part of the search criteria), etc.

The routine then continues to step 1925 to present the ranked employees to the user, and in the illustrated embodiment provides interactive controls to allow the user to adjust the rankings using various criteria and/or to specify two or more employees to be compared to each other. It is then determined in step 1930 whether the user wishes to adjust the rankings, and if so the routine continues to step 1935 to receive an instruction about how to perform the re-ranking and to then re-rank the employees as indicated. The routine then returns to step 1925 to present the re-ranked employees. If it was instead determined in step 1930 that the user did not want to adjust the ranking, the routine continues to step 1940 to determine whether the user wishes to compare multiple employees. If so, the routine continues to step 1945 to receive indications of two or more employees, and in step 1950 presents competency-related information about each employee in a manner to facilitate comparison. In some embodiments, the user may be able to specify types of information to be used for the comparison, and other types of information that is not competency-related may also be used as part of the comparison instead of or in addition to the competency-related information.

If it was instead determined in step 1940 that the user did not want to compare the employees, the routine continues to step 1960 to perform another command if one was specified and it is appropriate. For example, the user may wish to retrieve specified types of non-competency-related information for the employee and present that information. After steps 1950 or 1955, the routine continues to step 1960 to determine whether to perform more interactive controls for the current identified employees. If so, the routine returns to step 1930. If not, or if it was determined in step 1910 that the user was not authorized, the routine continues to step 1995 to determine whether to continue. If so, the routine returns to step 1905, and if not the routine continues to step 1999 and ends.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method in a computing system, the method comprising:
   the computer system receiving a definition of a skill assessment group for a skill;
   the computer system receiving from an employee a first value representing a self-assessment of the skill of the employee;
   the computer system determining reviewers based at least in part on the skill assessment group definition for the skill;
   the computer system displaying a list of the determined reviewers on a user-interface;
   in response to the employee selecting a button on the user-interface, the computer system sending a request to each of the determined reviewers to provide a value representing their respective assessment of the skill of the employee;
   the computer system receiving second values from at least some of the determined reviewers, wherein each of the second values represents a respective assessment of the skill of the employee;
   the computer system calculating a third value as a function of the second values; and
   the computer system comparing the third value with the first value;
   the computer system replacing a value stored in memory with the first value if the third value is greater than or equal to the first value, wherein the value represents a prior assessment of the skill of the employee.

2. The method of claim 1 wherein the reviewers are determined relative to the employee and to a work position of the employee, such that the reviewers for the employee include at least one supervisor of the employee, at least one peer of the employee, and at least one subordinate of the employee.

3. The method of claim 1 further comprising:
   the computer system receiving a definition of a criteria that comprises a specified threshold;
   wherein calculating the third value comprises:
   assigning a validation value to each of the second values;
   assigning a weight to each of the second values based at least in part on the reviewer from which the second value was obtained;
   calculating the third value based on the assigned validation values, the criteria and the assigned weights.

4. A computer-implemented method comprising:
   the computer system receiving from a first employee a first value representing a self-assessment of a first skill of the first employee;
   the computer system determining first reviewers;
   the computer system displaying a list of the determined reviewers on a user-interface.
   in response to the employee selecting a button on the user-interface, the computer system sending a request to each of the determined first reviewers to provide a value representing their respective assessment of the first skill of the first employee;
   the computer system receiving first assessment values from at least some of the determined first reviewers, wherein each of the first assessment values represents a respective assessment of the first skill of the first employee;
   the computer system calculating a third value as a function of the first assessment values; and
   the computer system comparing the third value with the first value;
   the computer system updating stored competency information for the first employee if the third value is equal to or greater than the first value;
   the computer system receiving from a second employee a second value representing a self-assessment of a second skill of the second employee;
   the computer system determining second reviewers;
   the computer system sending a request to each of the determined second reviewers to provide a value representing their respective assessment of the second skill of the second employee;
   the computer system receiving second assessment values from at least some of the determined second reviewers, wherein each of the second assessment values represents a respective assessment of the second skill of the second employee;
   the computer system calculating a fourth value as a function of the second assessment values; and
   the computer system comparing the fourth value with the second value.

5. The method of claim 4 wherein the updating of the stored competency information includes indicating information about the first valuation values.

6. The method of claim 4 wherein the determined first reviewers include at least one supervisor of the first employee, at least one peer of the first employee, and at least one subordinate of the first employee.

7. The method of claim 4 wherein the determined first reviewers are distinct from the determined second reviewers.

8. The method of claim 4 wherein the third and fourth values are distinct.

9. The method of claim 4 wherein the third and fourth values are equal to each other.

10. A method in a computing system, the method comprising:
   the computer system receiving a definition of a skill assessment group for a skill;
   the computer system receiving from an employee a first value representing a self-assessment of the skill of the employee;
   the computer system determining reviewers based at least in part on the skill assessment group definition for the skill;
   the computer system displaying a list of the determined reviewers on a user-interface;
   in response to the employee selecting a button on the user-interface, the computer system sending a request to each of the determined reviewers to provide a value representing their respective assessment of the skill of the employee;
   the computer system receiving second values from at least some of the determined reviewers, wherein each of the second values represents a respective assessment of the skill of the employee;
   the computer system comparing each of the second value to the first value;
   the computer system replacing a value stored in memory with the first value if each of the second values is greater than or equal to the first value, wherein the value represents a prior assessment of the skill of the employee.

* * * * *

UNITED STATES PATENT AND TRADEMARK OFFICE
CERTIFICATE OF CORRECTION

| | | |
|---|---|---|
| PATENT NO. | : 7,805,381 B2 | Page 1 of 1 |
| APPLICATION NO. | : 10/185891 | |
| DATED | : September 28, 2010 | |
| INVENTOR(S) | : Juergen Habichler et al. | |

It is certified that error appears in the above-identified patent and that said Letters Patent is hereby corrected as shown below:

In column 20, line 44, delete "Ul" and insert -- UI --, therefor.

In column 20, line 53, delete "M" and insert -- AA --, therefor.

In column 20, line 58, delete "M" and insert -- AA --, therefor.

In column 20, line 62, delete "M" and insert -- AA --, therefor.

In column 20, line 67, delete "M" and insert -- AA --, therefor.

In column 21, line 4, delete "M" and insert -- AA --, therefor.

In column 21, line 14, delete "M," and insert -- AA, --, therefor.

In column 36, line 28, in claim 4, delete "." and insert -- ; --, therefor.

Signed and Sealed this
Thirty-first Day of May, 2011

David J. Kappos
*Director of the United States Patent and Trademark Office*